(12) United States Patent
Candelore

(10) Patent No.: US 12,259,955 B2
(45) Date of Patent: Mar. 25, 2025

(54) AUTHENTICATION OF USERS BASED ON RE-ENTRY OF PASSWORDS

(71) Applicant: SONY GROUP CORPORATION, Tokyo (JP)

(72) Inventor: Brant L Candelore, Poway, CA (US)

(73) Assignee: SONY GROUP CORPORATION, Tokyo (JP)

( * ) Notice: Subject to any disclaimer, the term of this patent is extended or adjusted under 35 U.S.C. 154(b) by 282 days.

(21) Appl. No.: 18/065,314

(22) Filed: Dec. 13, 2022

(65) Prior Publication Data
US 2024/0193239 A1   Jun. 13, 2024

(51) Int. Cl.
*H04L 9/32* (2006.01)
*G06F 21/31* (2013.01)
*G06F 21/84* (2013.01)

(52) U.S. Cl.
CPC ............ *G06F 21/316* (2013.01); *G06F 21/84* (2013.01); *H04L 9/3226* (2013.01); *H04L 9/3239* (2013.01); *G06F 2221/2135* (2013.01); *G06F 2221/2137* (2013.01)

(58) Field of Classification Search
None
See application file for complete search history.

(56) References Cited

U.S. PATENT DOCUMENTS 10,108,790 B2   10/2018 Fujiwara
10,853,479 B2 *  12/2020 Sakata .................... G06F 21/46
2010/0205659 A1 *  8/2010 Suzuki ..................... G06F 21/34
  726/5
2018/0089404 A1 *  3/2018 Uchida ................... G06F 3/0488
2018/0089405 A1 *  3/2018 Onishi ..................... G06F 21/84

FOREIGN PATENT DOCUMENTS

JP    3677471 B2    8/2005

OTHER PUBLICATIONS

Lucian Constantin, "Hashing explained: Why it's your best bet to protect stored passwords", Feature, CSO India, Jan. 13, 2021, 6 pages.

* cited by examiner

*Primary Examiner* — Nelson S. Giddins
(74) *Attorney, Agent, or Firm* — CHIP LAW GROUP

(57) ABSTRACT

An electronic device and method for authentication of users based on re-entry of passwords is provided. The electronic device retrieves a pre-stored password associated with a user and a predefined number associated with the retrieved pre-stored password. The retrieved predefined number corresponds to a number of times an entry of a correct password is required for an authentication of the user. The electronic device receives a set of user inputs that corresponds to an entered password associated with the user. The electronic device compares, for the number of times associated with the user, the entered password in each user input with the retrieved pre-stored password. The electronic device determines that the entered password in each user input corresponds to the retrieved pre-stored password, based on the comparison. The electronic device authenticates the user based on the determination and controls a display device to render authentication information based on the authentication.

20 Claims, 13 Drawing Sheets

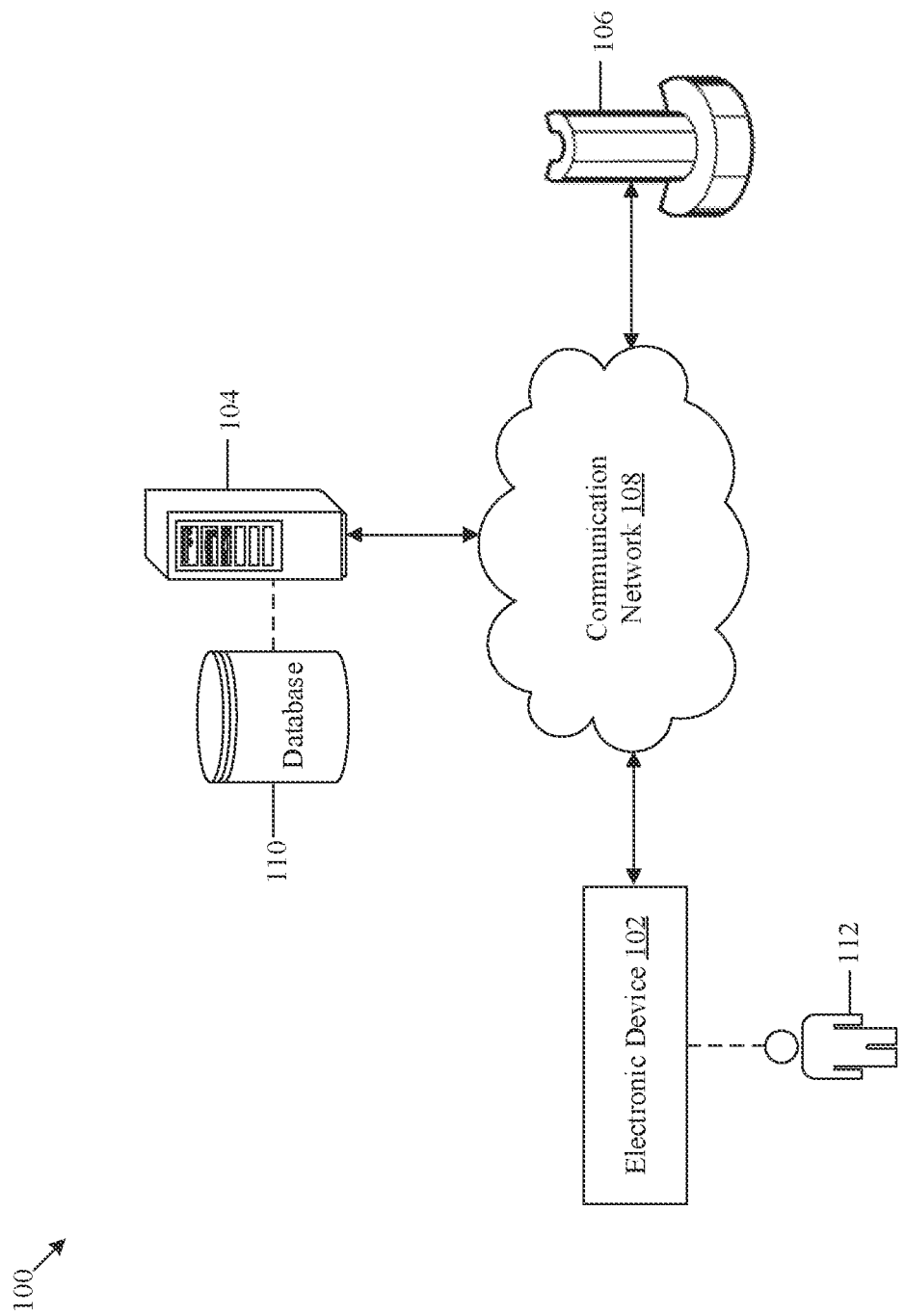

AUTHENTICATION OF USERS BASED ON RE-ENTRY OF PASSWORDS

CROSS-REFERENCE TO RELATED APPLICATIONS/INCORPORATION BY REFERENCE

None.

FIELD

Various embodiments of the disclosure relate to password based authentication methods. More specifically, various embodiments of the disclosure relate to an electronic device and a method for authentication of users based on re-entry of passwords.

BACKGROUND

Advancements in the field of information security have led to development of various types of password-based authentication schemes. The authentication schemes may be employed in personal user devices, servers that provide password-protected services (for example, email services, finance and banking related services, or ticketing services), or may be employed in databases that may store records and information associated with private or government institutions and organizations. The authentication schemes may secure data (i.e., stored in the devices, servers, or databases) from unauthorized access (via hacking or snooping attacks using malicious software codes). Typically, the authentication schemes may require users to set-up a user-ID and a password to gain access to confidential data or information (stored in the personal user devices, servers, or databases) or use the data to perform transactions (with the servers or databases) using the personal user devices. Some of the authentication schemes may further use a second (or multi-) factor authentication to enhance the security of the authentication schemes.

In order to ensure that the data is protected from unauthorized access and integrity of the data is maintained, the user may be required to set strong passwords. The passwords may need to be long and include multiple character types (for example, alphabets of different cases, numbers, and/or special characters). The user may self-generate the passwords or use a password manager to generate the passwords. In both instances, it may be difficult for the user to remember a complex password, particularly if the password is rarely used or in case the user uses different passwords to secure different accounts. Further, in case of lengthy passwords, the user may be prone to enter wrong passwords. Some users may prefer to use simpler passwords and may even use the same passwords to secure multiple accounts in order to avoid hassles associated with password recollection and input. However, simple passwords may be vulnerable to attacks and may lead to breach of data confidentiality or data integrity.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for authentication of users based on re-entry of passwords, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 1 is a diagram that illustrates an exemplary network environment for authentication of a user based on re-entry of passwords, in accordance with an embodiment of the disclosure.

DETAILED DESCRIPTION

Figure 2A:
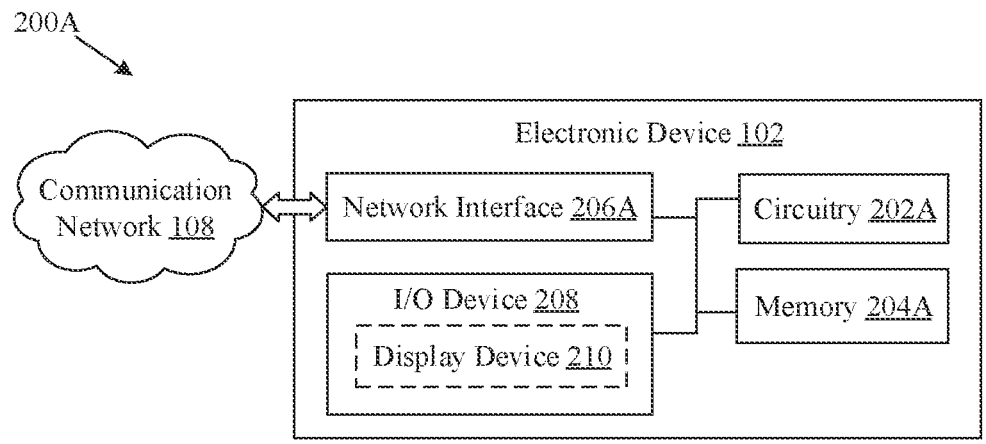
FIG. 2A is a block diagram that illustrates an exemplary electronic device of FIG. 1, for authentication of a user based on re-entry of passwords, in accordance with an embodiment of the disclosure.

The following described implementations may be found in a disclosed electronic device and method for authentication of users based on re-entry of passwords. Exemplary aspects of the disclosure provide an electronic device (for example, a mobile phone, a smart phone, a desktop, a laptop, a personal computer, a server, or the like) that may authenticate a user. The electronic device may retrieve a pre-stored password or password hash associated with a user. For the sake of security of the storage, the password may not be stored in-the-clear or encrypted by a key, but rather hashed. The hash may be stored in the electronic device, which may be unique to the password. The password hash may not be useful for determination of the password. For example, the hash may use MD5, SHA-2 or any other suitable hashing algorithm. The electronic device may further retrieve a predefined number associated with the retrieved pre-stored password. The retrieved predefined number may correspond to a number of times an entry of a correct password may be required for an authentication of the user. The electronic device may receive a set of user inputs associated with the authentication of the user. Each user input of the received set of user inputs may correspond to an entered password associated with the user. The electronic device may further compare, for the number of times associated with the user, the entered password in each user input with the retrieved pre-stored password. The electronic device may determine whether the entered password in each user input corresponds to the retrieved pre-stored password, based on the comparison performed for the number of times associated with the user. The electronic device may further authenticate the user based on the determination that the entered password, in each user input of the received set of user inputs, corresponds to the retrieved pre-stored password for the number of times associated with the user. The electronic device may control a display device to render authentication information, based on the authentication of the user.

Typically, users need to create passwords to store information confidentially (in a personal device or a server), access confidential information (stored in a server or a database) or perform transactions that involve exchange of confidential information between user personal devices and servers or databases to avail services. In order to ensure that the information is protected from unauthorized access, (i.e., ensure the information remains confidential and secure (impervious to theft via hacking or snooping) and that the integrity of the information is not compromised (impervious to manipulation or tampering)), the created passwords need to be strong or complex. A strong password may be able to withstand attacks (on the server, database, or personal device) such as brute-force attacks, man-in-the-middle attacks, dictionary attacks, and so on. In order to ensure that the passwords created by the users are strong, the password managers may be configured such that a password may be accepted (during creation) only if the password includes a minimum number of characters or more than one type of character. However, it may be challenging for the users to remember such passwords, particularly if the passwords are not used regularly or if the users need to remember multiple such passwords. The users may also be likely to incorrectly enter such passwords, which may lead to annoyance or frustration on part of the user, or delay associated with access or retrieval of the confidential information.

In order to address such issues, the electronic device may provide an authentication scheme that may allow users to set simpler or shorter passwords, which may be convenient for the users to remember. The electronic device may authenticate a user based on a reception of a correct password (that may be entered by a user) for a predefined number of times. The predefined number of times, that the user needs to enter the correct password, may be a secret. The requirement for a user to enter the correct password for the predefined number of times may overcome data security vulnerabilities that may arise due to usage of simpler passwords. Further, the requirement may provide an additional layer of security (apart from the password itself), since a hacker may need to determine the predefined number, in addition to the password, to gain access to confidential (or secret) information. In other words, the predefined number may, by itself, be a secret that may be needed for access. The electronic device may render user interface elements, for reception of the password, such that potential leakage of the predefined number may be prevented.

FIG. 1 is a diagram that illustrates an exemplary network environment for authentication of a user based on re-entry of passwords, in accordance with an embodiment of the disclosure. With reference to FIG. 1, there is shown a network environment 100. The network environment 100 includes an electronic device 102, a server 104, and a system 106. The electronic device 102 may communicate with the server 104 and the system 106 through one or more networks (such as, a communication network 108). The server 104 may include a database 110. There is further shown a user 112 associated with the electronic device 102. The electronic device 102, the server 104, or the system 106 may authenticate the user 112 based on a reception, for a predefined number of times, of a correct password associated with the user 112, via the electronic device 102.

The electronic device 102 may include suitable logic, circuitry, interfaces, and/or code that may be configured to retrieve a pre-stored password associated with the user 112 and a predefined number associated with the retrieved pre-stored password. The retrieved predefined number may correspond to a number of times an entry of a correct password may be required for an authentication of the user 112. The electronic device 102 may receive a set of user inputs associated with the authentication of the user 112. Each user input of the received set of user inputs may correspond to an entered password associated with the user 112. For the number of times associated with the user 112, the electronic device 102 may compare, the entered password in each user input (of the received set of user inputs) with the retrieved pre-stored password. The electronic device 102 may determine whether the entered password in each user input, of the received set of user inputs, corresponds to the retrieved pre-stored password, of if the input is subsequently hashed, with the pre-stored password or password hash, based on the comparison for the number of times associated with the user 112. The electronic device 102 may authenticate the user 112 based on the determination that the entered password in each user input, of the received set of user inputs, corresponds to the retrieved pre-stored password for the number of times associated with the user 112. The electronic device 102 may control a display device to render authentication information, based on the authentication of the user 112. Examples of the electronic device 102 may include, but may not be limited to, a desktop, a tablet, a laptop, a computing device, a smartphone, a cellular phone, a mobile phone, a mainframe machine, a server, a computer work-station, a consumer electronic (CE) device with a display, or a system.

The server 104 may include suitable logic, circuitry, interfaces, and/or code that may be configured to receive requests from the electronic device 102 to store confidential information, retrieve confidential information, access confidential information or records, or avail services (such as, to perform certain transactions). The server 104 may be configured to retrieve a password associated with the user 112 and the predefined number associated with the retrieved pre-stored password. The retrieval of the password and the predefined number may be based on a reception of a set of inputs, from the electronic device 102, associated with the authentication of the user 112. Each user input of the received set of user inputs may correspond to an entered password associated with the user 112. The server 104 may be configured to compare, for the number of times associated with the user 112, the entered password in each user input (of the received set of user inputs) with the retrieved pre-stored password. The server 104 may be configured determine whether the entered password in each user input, of the received set of user inputs, corresponds to the retrieved pre-stored password, based on the comparison for the number of times associated with the user 112. Further, the server 104 may authenticate the user 112 based on the determination that the entered password in each user input (of the received set of user inputs) corresponds to the retrieved pre-stored password for the number of times associated with the user 112. Thereafter the server 104 may transmit authentication information, based on the authentication of the user 112, to the electronic device 102 (for rendering by the electronic device 102). Based on the authentication of the user 114, the server 104 may allow the user 112 to access/store/retrieve confidential information stored in the server 104, or provide services to the user 112, via a user interface client included in the electronic device 102. The server 104 may execute operations through web applications, cloud applications, HTTP requests, repository operations, file transfer, and the like. Example implementations of the server 104 may include, but are not limited to, a database server, a file server, a web server, an application server, a mainframe server, a cloud computing server, or a combination thereof.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The system 106 may include suitable logic, circuitry, interfaces, and/or code that may be configured to receive requests from the electronic device 102 for access to resources of the system 106. The resources may include physical resources or software resources. Based on the received requests, the system 106 may retrieve the pre-stored password and the predefined number. The system 106 may be further configured to receive a set of user inputs, from the electronic device 102, that correspond to an entered password. The system 106 may compare, for the number of times associated with the user 112, the entered password in each user input, of the set of user inputs, with the retrieved pre-stored password. The system 106 may authenticate the user 112 to access the physical or software resources of the system 106, based on a correspondence (determined based on the comparison) between the entered password in each user input and the pre-stored password for the number of times. The system 106 may transmit authentication information, based on the authentication of the user 112, to the electronic device 102 (for rendering by the electronic device 102). Based on the authentication of the user 114, the system 106 may allow the user 112 to access the resources of the system 106. Example implementations of the system 106 may include, but are not limited to, a virtual desktop infrastructure that may host virtual machines, a mechanical system that comprises machines controlled using actuators (which may be activated remotely or via signals based on authentication of the user 112), a physical locker, a door of a protected or restricted area, or an electro-mechanical device.

The communication network 108 may include a communication medium through which the electronic device 102 and the server 104, or the electronic device 102 and the system 106, may communicate with each other. The communication network 108 may be a wired or wireless communication network. Examples of the communication network 108 may include, but are not limited to, Internet, a cloud network, Cellular or Wireless Mobile Network (such as Long-Term Evolution and 5th Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The database 110 may include suitable logic, interfaces, and/or code that may be configured to store confidential data or records. The database 110 may be derived from data off a relational or non-relational database or a set of comma-separated values (csv) files in conventional or big-data storage. The database 110 may be stored or cached on a device, such as the server 104. The device (i.e., the server 104) may be configured to query the database 110 for the confidential data based on authentication of the user 112, by the server 104, via the electronic device 102. In response, the server 104 may retrieve results (i.e., confidential data) and deliver the results to the electronic device 102.

In some embodiments, the database 110 may be hosted on a plurality of servers stored at same or different locations. The operations of the database 110 may be executed using hardware including a processor, a microprocessor (e.g., to perform or control performance of one or more operations), a field-programmable gate array (FPGA), or an application-specific integrated circuit (ASIC). In some other instances, the database 110 may be implemented using software.

In operation, the electronic device 102 may be configured to receive a user input that corresponds to a password set by the user 112. The password may be set to access, store, retrieve, modify, or perform transactions, based on confidential data stored in the electronic device 102, server 104 (and/or the database 110), or the system 106. Once the user input is received, the electronic device 102 may generate a first hash of the set password and store the first hash of the set password in the electronic device 102. In some embodiments, the electronic device 102 may transmit the received user input (i.e., the set password) to the server 104 or the system 106. The server 104 or the system 106 may generate the first hash of the set password and store the first hash.

The electronic device 102 may further receive a user input that corresponds to a "number" set by the user 112. The user may be required to enter the password (set by the user 112) for the (set) "number" of times to access, store, retrieve, modify, or perform transactions, based on the confidential data stored in the electronic device 102, server 104, or the system 106. The electronic device 102 may further generate a second hash of the "number" (set by the user 112) and store the second hash of the "number" in the electronic device 102. In some embodiments, the "number" may be generated by the server 104 or the system 106. The server 104 or the system 106 may further generate the second hash of the "number" and transmit the second hash via a message to a location (for example, a mail server or a cloud server) that may be secured and accessible to the user 112 based on authentication of the user 112.

In accordance with an embodiment, the electronic device 102 may be configured to retrieve a pre-stored password (i.e., the password set by the user 112) associated with a user (i.e., the user 112). The electronic device 102 may retrieve a hash (i.e., the first hash) of the pre-stored password (i.e., the password set by the user 112) for verification of a set of user inputs that correspond to a password entered by the user 112. The retrieval of the pre-stored password is described further, for example, in FIG. 3 (at 302).

The electronic device 102 may be further configured to retrieve a predefined number (i.e., the "number" set by the user 112) associated with the retrieved pre-stored password. The retrieved predefined number may correspond to a number of times an entry of a correct password is required for an authentication of the user 112. For example, the predefined number may be set (by the user 112, the electronic device 102, the server 104, or the system 106) as "3". Therefore, "3" entries of a correct password may be required for the authentication of the user 112. The electronic device 102 may retrieve a hash (i.e., the second hash) of the predefined number to verify whether a hash of a count of the set of user inputs match the second hash (i.e., the hash of the predefined number). The count of the set of user inputs may be determined based on user inputs of the set of user inputs that correspond to the correct pre-stored password (the count of the set of user inputs may not include user inputs of the set of user inputs that do not correspond to the correct pre-stored password). The retrieval of the pre-defined number is described further, for example, in FIG. 3 (at 304).

The electronic device 102 may be further configured to receive a set of user inputs associated with the authentication of the user 112. Each user input of the received set of user inputs may correspond to an entered password associated with the user 112. In accordance with an embodiment, a count of the received set of user inputs may correspond to the retrieved predefined number. For example, in case the retrieved predefined number is "3", the electronic device 102 may receive "3" user inputs (i.e., the received set of user inputs may include 3 inputs), and each of the 3 inputs may correspond to the entered password. The user 112 may provide "3" user inputs based on the predefined number (for example, 3). In accordance with an embodiment, the electronic device 102 may generate a hash of each user input of the set of user inputs. The electronic device 102 may further generate a hash of the count of the received set of user inputs. The electronic device 102 may authenticate the user 112 based on a reception of "3" correct entries of the password (i.e., the password set by the user 112 or the pre-stored password) associated with the user 112. In accordance with an embodiment, a first user input may correspond to an entry of the correct password and a second user input may correspond to an entry of an incorrect password. In accordance with another embodiment, the first user input may correspond to an entry of an incorrect password and the second user input may correspond to an entry of the correct password. The reception of the set of user inputs is described further, for example, in FIG. 3 (at 306).

The electronic device 102 may be further configured to compare, for the number of times associated with the user 112, the entered password in each user input (of the received set of user inputs) with the retrieved pre-stored password. For example, the electronic device 102 may perform "3" comparisons of the entered password in each user input of the set of user inputs (i.e., "3" user inputs) with the retrieved pre-stored password or. The electronic device 102 may perform "3" comparisons based on the predefined number (for example, "3"). In accordance with an embodiment, the electronic device 102 may generate a hash of each user input of the set of user inputs. The electronic device 102 may perform a first comparison between the hash of each of user input of the set of user inputs and the first hash (i.e., the hash of the retrieved pre-stored password). The electronic device 102 may further perform a second comparison between the hash of the count of the received set of user inputs and the second hash (i.e., the hash of the retrieved predefined number). The comparison of the count of the set of user inputs and the pre-defined number is described further, for example, in FIG. 3 (at 310).

The electronic device 102 may further determine whether the entered password in each user input (of the received set of user inputs) corresponds to the retrieved pre-stored password, based on the comparison performed for the number of times associated with the user. In accordance with an embodiment, the electronic device 102 may determine a first outcome of each of the comparisons (for example, "3" first comparisons) associated with a hash of each user input of the set of user inputs (for example, "3" user inputs) and the first hash. The electronic device 102 may further determine a second outcome of the second comparison (i.e., between the hash of the count of the received set of user inputs and the second hash). Based on the first outcome and the second outcome, the electronic device 102 may determine whether some correspondence exists between each user input, of the received set of user inputs, and the retrieved pre-stored password. The comparison of the entered password and the pre-stored password is described further, for example, in FIG. 3 (at 308).

The electronic device 102 may be further configured to authenticate the user 112 based on the determination that the entered password in each user input, of the received set of user inputs, corresponds to the retrieved pre-stored password for the number of times associated with the user 112. The correspondence of the retrieved pre-stored password with the received set of user inputs may be determined based on the comparison for the number of times associated with the user 112. For example, the electronic device 102 may determine, based on the comparison for the number of times (for example, "3" comparisons if the predefined number is "3"), that the entered password in each of the received set of user inputs (for example, "3" user inputs) corresponds to the retrieved pre-stored password. The determination may be based on the first comparison in which a match may be detected between the hash of the entered password in each of the "3" user inputs and the hash (i.e., first hash) of the retrieved pre-stored password. The electronic device 102 may further determine, based on the second comparison, a match between the hash of the count of the received set of user inputs and the hash of the retrieved predefined number (i.e., the second hash). The authentication of the user 112, by the electronic device 102 may be based on the first comparison and the second comparison. The user authentication is further described, for example, in FIG. 3 (at 312).

The electronic device 102 may be further configured to control a display device (for example, a display device 210 of FIG. 2) to render authentication information, based on the authentication of the user 112. In accordance with an embodiment, the electronic device 102 may display a message that indicates that the user 112 is authenticated. Thereafter, the user 112 may be able to access, store, retrieve, modify, or perform transactions, based on confidential data stored in the electronic device 102, server 104, or the system 106.

In some embodiments, the electronic device 102 may control the display device 210 to display a message that indicates that user authentication is not successful. The message may further indicate that the user 112 needs to reinitiate user authentication procedure or that the user authentication is disabled for a predefined time period. The user authentication is not successful if the hash of the entered password in each user input of the received set of user inputs do not match the first hash, or a count of the received set of user inputs (includes received user inputs that correspond to the pre-stored password) do not match the second hash. The control of the rendering of the authentication information is described further, for example, in FIG. 3 (at 314).

FIG. 2A is a block diagram that illustrates an exemplary electronic device of FIG. 1, for authentication of a user based on re-entry of passwords, in accordance with an embodiment of the disclosure. FIG. 2A is explained in conjunction with elements from FIG. 1. With reference to FIG. 2A, there is shown a block diagram 200A of the electronic device 102. The electronic device 102 may include circuitry 202A, a memory 204A, a network interface 206A, and an input/output (I/O) device 208. In at least one embodiment, the I/O device 208 may also include a display device 210. The circuitry 202A may be communicatively coupled to the memory 204A, the network interface 206A, and the I/O device 208, through wired or wireless communication medium associated with the electronic device 102.

The circuitry 202A may include suitable logic, circuitry, and interfaces that may be configured to execute program instructions associated with different operations to be executed by the electronic device 102. The operations may include retrieval of a pre-stored password associated with the user 112. The operations may further include retrieval of a predefined number associated with the retrieved pre-stored password, where the predefined number may correspond to a number of times an entry of a correct password is required for an authentication of the user 112. The operations may further include reception of a set of user inputs associated with the authentication of the user 112, where each user input of the received set of user inputs corresponds to an entered password associated with the user 112. The operations may further include comparison, for the number of times associated with the user 112, the entered password in each user input, of the received set of user inputs, with the retrieved pre-stored password. The operations may further include determination of whether the entered password in each user input, of the received set of user inputs, corresponds to the retrieved pre-stored password, based on the comparison for the number of times associated with the user 112. The operations may further include authentication of the user 112 based on the determination that the entered password in each user input, of the received set of user inputs, corresponds to the retrieved pre-stored password for the number of times associated with the user 112. The operations may further include control of the display device 210 to render authentication information, based on the authentication of the user 112. The circuitry 202A may include one or more specialized processing units, which may be implemented as an integrated processor or a cluster of processors that perform the functions of the one or more specialized processing units, collectively. The circuitry 202A may be implemented based on a number of processor technologies known in the art. Examples of implementations of the circuitry 202A may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204A may include suitable logic, circuitry, interfaces, and/or code that may be configured to store the program instructions to be executed by the circuitry 202A. The program instructions stored on the memory 204A may enable the circuitry 202A to execute operations of the circuitry 202A (and/or the electronic device 102). In at least one embodiment, the memory 204A may store the pre-stored password associated with the user 112 and the predefined number associated with the retrieved pre-stored password. The password and the predefined number may be stored in the memory 204A based on a reception of a user input (for setting of the password) that corresponds to the password and/or the predefined number. The user 112 may provide the user input to set the password and the predefined number. In some embodiments, the circuitry 202A may randomly generate the predefined number and store the predefined number in the memory 204A. The memory 204A may further store a hash (generated by the circuitry 202A) of the password and a hash (generated by the circuitry 202A) of the predefined number. Examples of implementation of the memory 204A may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206A may include suitable logic, circuitry, and interfaces that may be configured to facilitate a communication between the circuitry 202A and the server 104 or between the circuitry 202A and the system 106, via the communication network 108. The network interface 206A may be implemented by use of various known technologies to support wired or wireless communication of the electronic device 102 with the communication network 108. The network interface 206A may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 206A may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a near field communication protocol, and a wireless pear-to-pear protocol.

The I/O device 208 may include suitable logic, circuitry, interfaces, and/or code that may be configured to receive an input and provide an output based on the received input. For example, the I/O device 208 may receive user inputs that include a password set by the user 112 for authentication of the user 112 and a predefined number set by the user that corresponds to a number of times a correct entry of the set password is required for an authentication of the user 112. The I/O device 208 may further receive a set of user inputs from the user 112. Each input of the set of user inputs may correspond to an entered password. The I/O device 208 may render the authentication information, based on the authentication of the user 112. Further, the I/O device 208 may display information associated with a secure resource based on the authentication of the user 112. Examples of the I/O device 208 may include, but are not limited to, a touch screen, a keyboard, a mouse, a joystick, a microphone, the display device 210, and a speaker. Examples of the I/O device 208 may further include braille I/O devices, such as, braille keyboards and braille readers.

The I/O device 208 may include the display device 210. The display device 210 may include suitable logic, circuitry, and interfaces that may be configured to receive inputs from the circuitry 202A to render, on a display screen, a user interface of a user authentication client. The display screen may receive, via user interface elements of the user authentication client, the set of user inputs associated with the authentication of the user 112 (that correspond to the entered password). The display screen may render the authentication information, based on the authentication of the user 112. Further, the display screen may display information associated with a secure resource based on the authentication of the user 112. In at least one embodiment, the display screen may be at least one of a resistive touch screen, a capacitive touch screen, or a thermal touch screen. The display device 210 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The functions or operations executed by the electronic device 102, as described in FIG. 1, may be performed by the circuitry 202A. Operations executed by the circuitry 202A are described in detail, for example, in FIGS. 3, 4A, 4B, 4C, 4D, 5A, 5B, 5C, and 6.

Figure 2B:
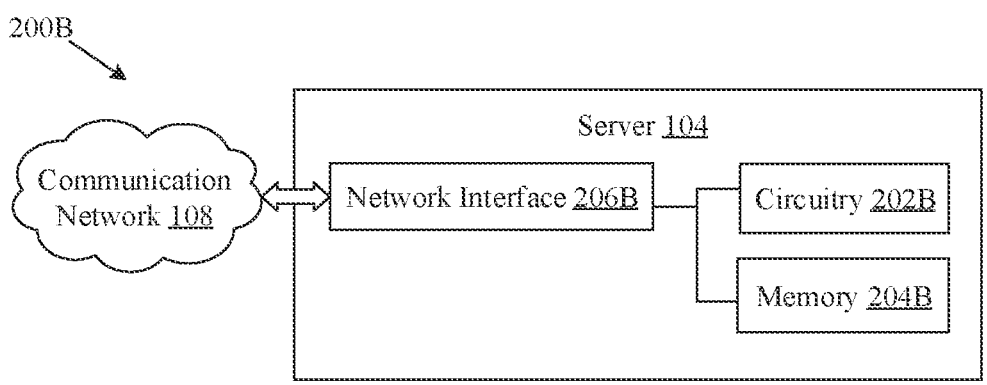
FIG. 2B is a block diagram that illustrates an exemplary server of FIG. 1, for authentication of a user based on re-entry of passwords, in accordance with an embodiment of the disclosure.

FIG. 2B is a block diagram that illustrates an exemplary server of FIG. 1, for authentication of a user based on re-entry of passwords, in accordance with an embodiment of the disclosure. FIG. 2B is explained in conjunction with elements from FIG. 1 and FIG. 2A. With reference to FIG. 2B, there is shown a block diagram 200B of the server 104. The server 104 may include circuitry 202B, a memory 204B, and a network interface 206B. The circuitry 202B may be communicatively coupled to the memory 204B and the network interface 206B, through wired or wireless communication medium of the server 104.

The circuitry 202B may include suitable logic, circuitry, and interfaces that may be configured to execute program instructions associated with different operations to be executed by the server 104. A set of functions of the circuitry 202B may be same as the functions of the circuitry 202A described, for example, in FIG. 2A. Therefore, description of the set of functions of the circuitry 202B (same as that of the circuitry 202A) is omitted from the disclosure for the sake of brevity.

The circuitry 202B may be configured to perform additional functions (apart from the set of functions same as that of the circuitry 202A). In at least one embodiment, the circuitry 202B may be configured to receive the set of user inputs, associated with the authentication of the user 112, from the electronic device 102. The reception may be based on transmission, by the circuitry 202A, of the set of the user inputs to the server 104. Each user input of the received set of user inputs may correspond to an entered password associated with the user 112.

The circuitry 202B may be further configured to transmit the authentication information to the electronic device 102 (for rendering of the authentication information by the circuitry 202A on the display device 210). The authentication information may be transmitted based on an authentication of the user 112, by the circuitry 202B. The circuitry 202B may authenticate the user 112 based on correspondence of each user input, of the received set of user inputs, to a password (pre-stored in the server 104) for a predefined number (pre-stored in the server 104) of times associated with the user 112.

The memory 204B may include suitable logic, circuitry, interfaces, and/or code that may be configured to store the program instructions to be executed by the circuitry 202B. The program instructions stored on the memory 204B may enable the circuitry 202B to execute operations of the circuitry 202B (and/or the server 104). The functions of the memory 204B may be same as the functions of the memory 204A described, for example, in FIG. 2A. Therefore, the description of the memory 204B is omitted from the disclosure for the sake of brevity.

The network interface 206B may include suitable logic, circuitry, and interfaces that may be configured to facilitate a communication between the circuitry 202B and the circuitry 202A, via the communication network 108. The implementation of the network interface 206B may be same that of the network interface 206A described, for example, in FIG. 2A. Therefore, the implementation details of the network interface 206B are omitted from the disclosure for the sake of brevity. Further, functions of the network interface 206B may be same as the functions of the network interface 206A described, for example, in FIG. 2A. Therefore, the description of the network interface 206B is omitted from the disclosure for the sake of brevity.

Figure 3:
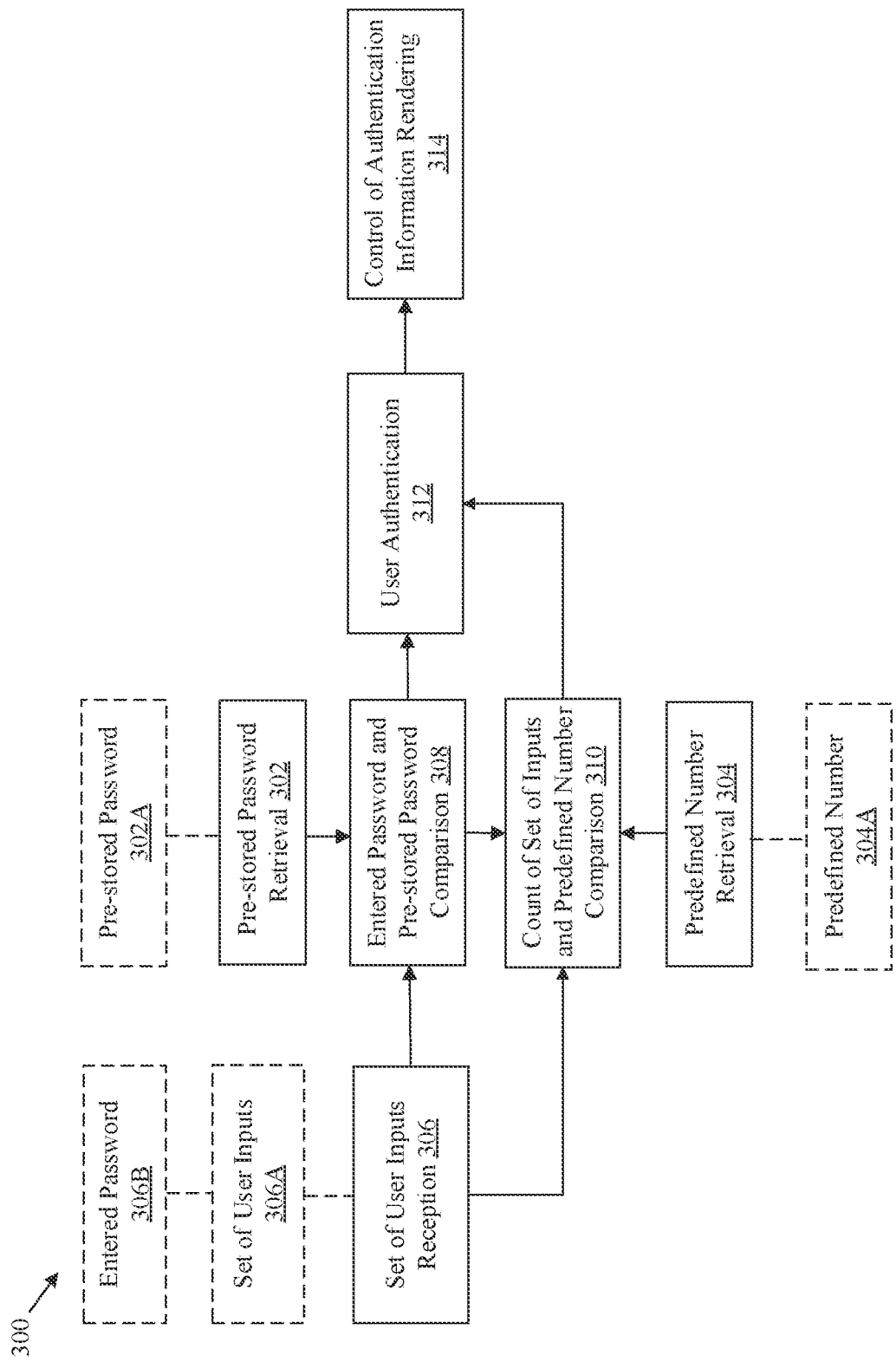
FIG. 3 is a diagram that illustrates an exemplary execution pipeline for authentication of a user based on re-entry of passwords, in accordance with an embodiment of the disclosure.

FIG. 3 is a diagram that illustrates an exemplary execution pipeline for authentication of a user based on re-entry of passwords, in accordance with an embodiment of the disclosure. FIG. 3 is explained in conjunction with elements from FIG. 1, FIG. 2, FIG. 2A, and FIG. 2B. With reference to FIG. 3, there is shown an exemplary pipeline 300. The exemplary pipeline 300 may include a set of operations (for example, operations 302 to 314) that may be executed by one or more components of FIG. 1, such as, the electronic device 102. The set of operations may be performed by the circuitry 202A of the electronic device 102 to authenticate the user 112 based on a reception of a set of inputs from the user 112 that correspond to a password entered by the user 112.

At 302, a pre-stored password 302A associated with the user 112 may be retrieved. In accordance with an embodiment, the circuitry 202A may be configured to retrieve the pre-stored password 302A associated with the user 112. The circuitry 202A may receive a user input indicative of a password set by the user 112. The pre-stored password 302A may correspond to the password set by the user 112. The circuitry 202A may generate a first hash of the user input (i.e., the set password) and store the first hash in the memory 204A. The pre-stored password (i.e., the set password) or the first hash may be retrieved (from the memory 204A) based on a reception of one or more user inputs that correspond to an entered password. For example, the pre-stored password 302A may be retrieved based on a request from the user 112 to access a resource secured by the pre-stored password 302A. The request from the user 112 may include one or more user inputs that may correspond to a password entered by the user 112 for access to the secure resource.

At 304, a predefined number 304A associated with the pre-stored password 302A may be retrieved. In accordance with an embodiment, the circuitry 202A may be configured to retrieve the predefined number 304A associated with the pre-stored password. The circuitry 202A may receive a user input indicative of a "number" set by the user 112. The "number" may correspond to the predefined number 304A. The predefined number 304A may correspond to a number of times an entry of a correct password is required for an authentication of the user 112. Thus, the user 112 may be required to enter the set password (i.e., pre-stored password 302A) for the set number (i.e., the predefined number 304A) of times for the authentication of the user 112. For example, the user 112 may set the "number" (i.e., the predefined number 304A) as "5". In such case, the user 112 may be required to enter the pre-stored password 302A (i.e., the correct password) five times for getting authenticated. The circuitry 202A may generate a second hash of the received user input (i.e., the "number" set by the user 112 or the predefined number 304A) and store the second hash in the memory 204A. The circuitry 202A may retrieve the predefined number 304A or the second hash based on the reception of the one or more user inputs indicative of the entered password. For example, the pre-stored number 304A may be retrieved based on a request from the user 112 to access a resource secured by the pre-stored password 302A and by the pre-stored number 304A. The request from the user 112 may include one or more user inputs that may correspond to a password entered by the user 112 for access to the secure resource.

In some embodiments, the circuitry 202A may be configured to generate the predefined number 304A. The predefined number 304A may be generated based on the reception of the user input indicative of the password (i.e., the pre-stored password 302A) or based on an update of a previously generated predefined number associated with the pre-stored password or 302A. The circuitry 202A may further transmit the predefined number 304A to a secured location (for example, a mail server or a cloud server) that may be accessible to the user 112 based on the authentication of the user 112. Based on the generation of the predefined number 304A, the user 112 may be required to enter the correct password (i.e., the pre-stored password) for the predefined number 304A of times for the authentication of the user 112.

At 306, a set of user inputs 306A associated with the authentication of the user 112 may be received. In accordance with an embodiment, the circuitry 202A may be configured to receive the set of user inputs 306A associated with the authentication of the user 112. The user 112 may provide the set of user inputs 306A to access, modify, store, or retrieve confidential data stored in the electronic device 102. Each user input of the received set of user inputs 306A may correspond to an entered password 306B associated with the user 112. The circuitry 202A may further determine a count of the received set of user inputs 306A. For example, the circuitry 202A may receive "5" instances of user inputs that corresponds to the entered password 306B. Thus, the count of the received set of user inputs 306A may be determined as "5". In accordance with an embodiment, the count of the received set of user inputs 306A may correspond to the retrieved predefined number 304A (for example, "5"). The circuitry 202A may generate a third hash of the entered password 306B (in each of the received set of user inputs 306A) and a fourth hash of the determined count (for example, "5") of the received set of user inputs 306A.

At 308, the entered password 306B in each user input, of the received set of user inputs 306A, may be compared with the retrieved pre-stored password 302A for the number of times associated with the user 112. In accordance with an embodiment, the circuitry 202A may be configured to compare, for the number of times associated with the user 112, the entered password 306B in each user input, of the received set of user inputs 306A, with the pre-stored password 302A. The number of times associated with the user 112 may correspond to the retrieved predefined number 304A (for example, "5") since the count of the received set of user inputs 306A may correspond to the retrieved predefined number 304A. Thus, the circuitry 202A may compare the entered password 306B with the pre-stored password 302A for the predefined number 304A of times (for example, five times). Each comparison (of the five comparisons) may correspond to a comparison between a user input (i.e., the entered password 306B) of the received set of user inputs 306A (for example, 5 user inputs) and the retrieved pre-stored password 302A. The circuitry 202A may determine whether the entered password 306B in each user input, of the received set of user inputs 306A, corresponds to the retrieved pre-stored password 302A, based on the comparison performed for the number of times associated with the user 112. In accordance with an embodiment, the determination may be based on a first comparison between the first hash (i.e., the hash of the pre-stored password 302A) and the third hash (i.e., the hash of the entered password 306B) for the number of times (i.e., the predefined number 304A) associated with the user 112.

In some instances, the entered password 306B in each user input of the received set of user inputs 306A, may correspond to the retrieved pre-stored password 302A. For example, the first hash (i.e., the hash of the retrieved pre-stored password 302A) may match the third hash (i.e., the hash of the entered password 306B) for the number of times (i.e., the predefined number 304A) associated with the user 112.

In some other instances, the entered password 306B in each of the received set of user inputs 306A may not correspond to the retrieved pre-stored password 302A. For example, the first hash (i.e., the hash of the pre-stored password 302A) may not match the third hash (i.e., the hash of the entered password 306B) of each of the received set of user inputs 306A. For example, the circuitry 202A may receive "5" user inputs (i.e., the received set of user inputs 306A includes "5" user inputs) that correspond to the entered password 306B. Amongst the five received user inputs, the entered password 306B (or the hash of the entered password 306B (i.e., the third hash)) in two user inputs may not match the pre-stored password 302A (or the hash of the retrieved pre-stored password 302A (i.e., the first hash)). The entered password 306B in such two user inputs may be different from the entered password 306B in the three other user inputs. In such scenarios, the circuitry 202A may further determine a count of the received set of user inputs 306A that correspond to or match with the pre-stored password 302A. The count of the received set of user inputs 306A that correspond to (or match with) the pre-stored password 302A may be determined as "3", whereas the total count of the received set of user inputs 306A may be determined as 5. Thus, in this current scenario, the user 112 may not be authenticated.

At 310, the determined count of the received set of user inputs 306A and the predefined number 304A may be compared. In accordance with an embodiment, the circuitry 202A may be configured to compare the determined count of the received set of user inputs 306A with the predefined number 304A. The count of the received set of user inputs 306A may include those user inputs that correspond to the retrieved pre-stored password 302A. For example, the count of the received set of user inputs 306A (that correspond to the entered password 306B) may be determined as "5". Further, a count of the received set of user inputs 306A that correspond to the retrieved pre-stored password 302A may be determined as "3" (i.e., the entered password 306B may match the pre-stored password 302A on three out of five occasions). The circuitry 202A may compare the second hash (i.e., the hash of the predefined number 304A) with the fourth hash (i.e., the hash of the count of the received set of user inputs 306A that correspond to the retrieved pre-stored password 302A) to compare the count of the received set of user inputs 306A and the predefined number 304A.

At 312, based on the determination that the entered password 306B in each user input, of the received set of user inputs 306A, corresponds to the retrieved pre-stored password 302A for the number of times associated with the user 112, the user 112 may be authenticated. In accordance with an embodiment, the circuitry 202A may be configured to authenticate the user 112 based on the determination that the entered password 306B in each user input, of the received set of user inputs 306A, corresponds to (or matches with) the retrieved pre-stored password 302A for the number of times associated with the user 112. The circuitry 202A may determine the correspondence based on a match between the entered password 306B in each user input of the received set of user inputs 306A and the pre-stored password 302A. The match may be determined for a number of times corresponding to the predefined number 304A. In other words, the first hash may match the third hash (i.e., the hash of each user input of the received set of user inputs 306A that correspond to the entered password 306B) for the number (i.e., the predefined number 304A) of times. Further, the second hash may match the fourth hash (i.e., the hash of the predefined number 304A may match the hash of the count of the received set of user inputs 306A that correspond to the retrieved pre-stored password 302A).

In some instances, the entered password 306B in each of the received set of user inputs 306A (for example, five user inputs), may not correspond to the retrieved pre-stored password 302A for the number (i.e., the predefined number 304A) of times associated with the user 112. For example, the entered password 306B in two user inputs of the received set of user inputs 306A (i.e., 5 inputs) may not correspond to the retrieved pre-stored password 302A. Thus, the third hash of the two user inputs may not match the first hash. Further, the fourth hash may be determined based on correspondence between the entered password 306B in the three user inputs of the received set of user inputs 306A (i.e., five user inputs) and the pre-stored password 302A. Consequently, the second hash (i.e., hash of five) may not match the fourth hash (i.e., hash of three). The circuitry 202A may not authenticate the user 112 based on the mismatch between the first hash and the third hash (for two times) and the mismatch between the second hash and the fourth hash.

At 314, a display device (for example, the display device 210) may be controlled to render authentication information, based on the authentication of the user 112. In accordance with an embodiment, the circuitry 202A may be configured to control the display device 210 to render authentication information, based on the authentication of the user 112. The rendered authentication information may correspond to a message, which may indicate that the user 112 has been successfully authenticated. For example, based on a match between the first hash and the third hash of each of the received set of user inputs 306A, and a match between the second hash and the fourth hash, the user 112 may be authenticated. Such matches may indicate that the user 112 has entered the correct password for the predefined number of times (i.e., predefined number 304A). A message, such as, "authentication successful!", may be displayed to the user 112. Further, the user 112 may be provided, for example, with a menu including options available to the user 112 for secure resource access, based on the successful authentication of the user 112.

In some instances, the authentication of the user 112 may not be successful based on a mismatch of the entered password 306B (in at least one user input of the received set of user inputs 306A) from the retrieved pre-stored password 302A. In other words, the user 112 may not have entered the password 306B correctly for all the predefined number of times (i.e., predefined number 304A. In such instances, the rendered authentication information may correspond to a message, which may indicate that the user 112 may be required to re-initiate user authentication or the user authentication is disabled for a predefined period (for example, 24 hours).

Typically, users need to create passwords to store information confidentially (in a personal device or a server), access confidential information (stored in a server or a database) or perform transactions that involve exchange of confidential information between user personal devices and servers or databases to avail services. In order to ensure that the information is protected from unauthorized access, (i.e., ensure the information remains confidential and secure (impervious to theft via hacking or snooping) and that the integrity of the information is not compromised (impervious to manipulation or tampering)), the created passwords need to be strong or complex. A strong password may be able to withstand attacks (on the server, database, or personal device) such as brute-force attacks, man-in-the-middle attacks, dictionary attacks, and so on. In order to ensure that the passwords created by the users are strong, the password managers may be configured such that a password may be accepted (during creation) only if the password includes a minimum number of characters or more than one type of character. However, it may be challenging for the users to remember such passwords, particularly if the passwords are not used regularly or if the users need to remember multiple such passwords. The users may also be likely to incorrectly enter such passwords, which may lead to annoyance or frustration on part of the user, or delay associated with access or retrieval of the confidential information.

In order to address such issues, the electronic device 102 may provide an authentication scheme that may allow users to set simpler or shorter passwords, which may be convenient for the users to remember. The electronic device 102 may authenticate a user (e.g., the user 112) based on a reception of a correct password (that may be entered by the user) for a predefined number of times. The predefined number of times, that the user needs to enter the correct password, may be a secret and may already be set by the user to the disclosed electronic device. The requirement for a user to enter the correct password for the predefined number of times may overcome data security vulnerabilities that may arise due to usage of simpler passwords. Further, the requirement may provide an additional layer of security (apart from the password itself), since a hacker may need to determine the predefined number, in addition to the password, to gain access to confidential (or secret) information. The electronic device 102 may render user interface elements, for reception of the password, such that potential leakage of the pre-defined number may be prevented.

In an embodiment, the electronic device 102 may provide enhanced security by masking the fact that whether an entered password is correct or not. For example, irrespective of whether the user 112 enters a correct password, the electronic device 102 may display a notification to the user 112, which may indicate that the entered password is not correct. The notification may be displayed for each entry of password until the pre-defined number of correct entries of the password are received. A genuine user (e.g., the user 112) may be aware of the authentication scheme and may re-enter the correct password for the pre-defined number of times, however, a fake user or a hacker may be fooled and may not try further. Further, the correct password may not be revealed to the fake user or the hacker. Thus, the authentication of users may be made more secure.

Figure 4A:
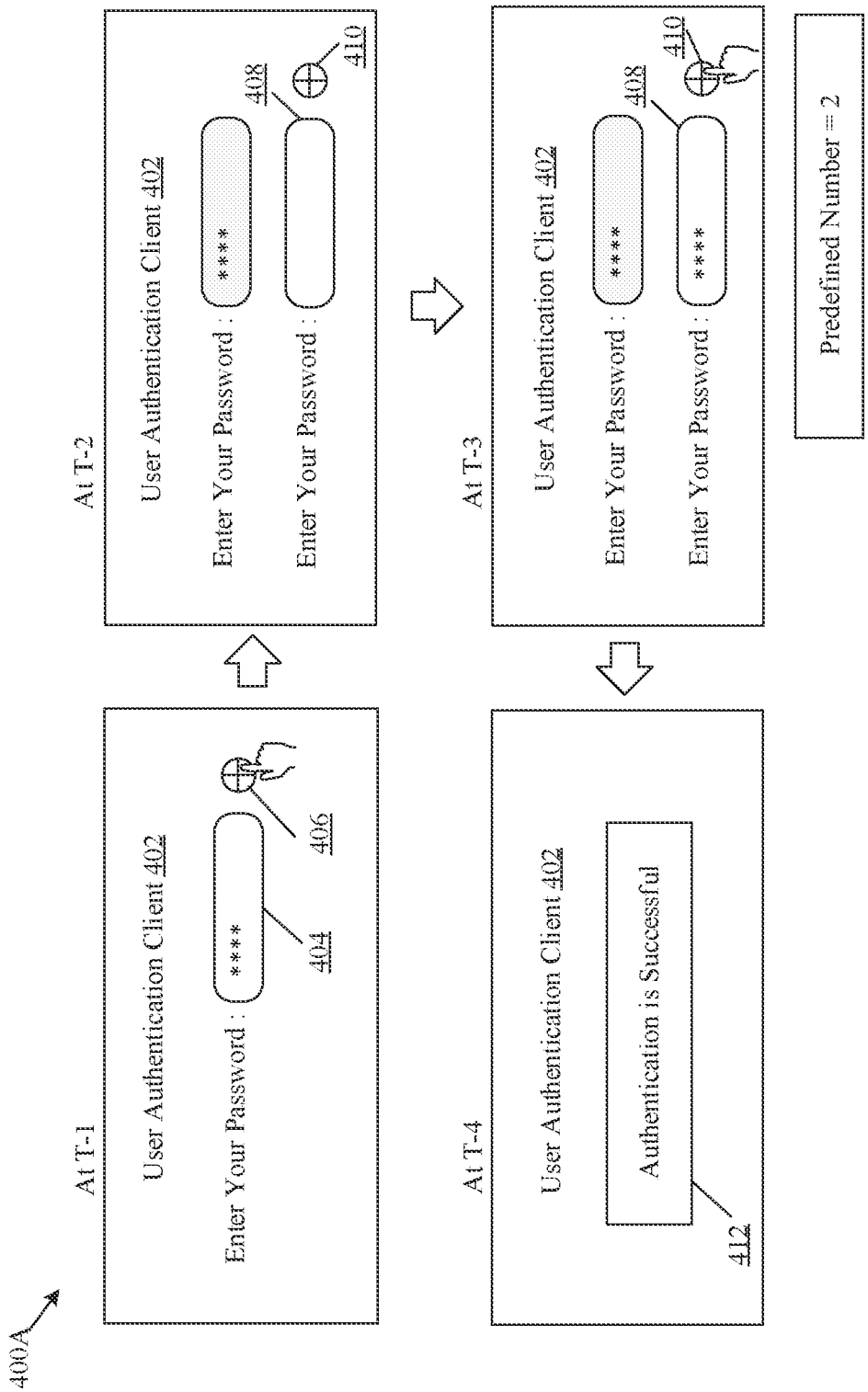
FIG. 4A is a diagram that illustrates an exemplary scenario for authentication of a user based on re-entry of passwords via a user authentication client, in accordance with an embodiment of the disclosure.

FIG. 4A is a diagram that illustrates an exemplary scenario for authentication of a user based on re-entry of passwords via a user authentication client, in accordance with an embodiment of the disclosure. FIG. 4A is explained in conjunction with elements from FIG. 1, FIG. 2A, FIG. 2B, and FIG. 3. With reference to FIG. 4A, there is shown an exemplary scenario 400A. In the exemplary scenario 400A, there is shown a User Interface (UI) of a user authentication client 402, that may be included in the electronic device 102. The user authentication client 402 may be a software that comprises program instructions executable on the electronic device 102 by the circuitry 202A to authenticate the user 112. The circuitry 202A may receive, via the user authentication client 402, a set of user inputs that correspond to passwords entered by the user 112. The UI of the user authentication client 402 may include UI elements for reception of the set of user inputs. The circuitry 202A may authenticate the user 112 based on comparisons between the set of user inputs and a pre-stored password associated with the user 112.

In accordance with an embodiment, the circuitry 202A may retrieve the pre-stored password from the memory 204A to perform the comparisons. The pre-stored password may correspond to a password set earlier by the user 112, via the user authentication client 402, for the authentication of the user 112. The comparison may be performed for a number of times associated with the user 112. The "number" may correspond to a predefined number associated with the pre-stored password. The user 112 may be required to enter a correct password (i.e., the pre-stored password) for the predefined number of times for the authentication of the user 112. The user 112 may set the predefined number, via the user authentication client 402, based on the setting of the pre-stored password.

By way of an example, but not limitation, the pre-stored password (i.e., the password set by the user 112) may be "ABCD". The set of user inputs may include two user inputs that correspond to passwords entered by the user 112 at two different time instances. The predefined number associated with the retrieved pre-stored password may be set as "2". The entered passwords may be rendered as "****" on the UI of the user authentication client 402, to mask the entered user input. The count of the set of user inputs (i.e., "2" inputs) may correspond to the retrieved predefined number (i.e., "2") if the entered passwords in both the first and second user inputs correspond to the pre-stored password.

At a time instance "T-1", the circuitry 202A may control the user authentication client 402 to render a UI element 404 (for example, a textbox) and a UI element 406 (for example, a button). The UI element 404 may enable the user 112 to enter a first user input of the set of user inputs and the UI element 406 may enable the user 112 to submit the first user input. The first user input may correspond to an entered password. The user 112 may click (or press) the UI element 406 to send the first user input. The circuitry 202A may receive the first user input based on a reception of the click input (or button press input) via the UI element 406. The circuitry 202A may compare the entered password (or the hash of the entered password generated at the time instance "T-1") with the pre-stored password (or the hash of the pre-stored password). The circuitry 202A may determine, based on the comparison, that the entered password in the first user input corresponds to the pre-stored password. In case the entered password in the first user input corresponds to the correct password, the hash of the entered password generated at "T-1" may match the hash of the pre-stored password. The circuitry 202A may further determine a count of the received set of user inputs that corresponds to the pre-stored password. The count may be determined as 1 (since the first user input corresponds to the pre-stored password).

At a time instance "T-2" (after the time instance "T-1"), the circuitry 202A may control the user authentication client 402 to render a UI element 408 (for example, a textbox) and a UI element 410 (for example, a button). The control may be based on the comparison (performed at "T-1") and the count of the received set of user inputs that corresponds to the pre-stored password. The circuitry 202A may determine that the count (i.e., determined as "1" at "T-2") may be less than the predefined number (e.g., 2; as shown in FIG. 4A). Thus, the user 112 may be required to enter the correct password (i.e., the prestored password), once again, as a second user input for the authentication of the user 112. The UI element 408 may enable the user 112 to enter the second user input and the UI element 410 may enable the user 112 to submit the second user input.

At a time instance "T-3" (after the time instance "T-2"), the user 112 may enter, via the UI element 408, a second user input that corresponds to an entered password. The user 112 may click (or press) the UI element 410 to submit the second user input. The circuitry 202A may receive the second user input based on a reception of the click input (or a button press input) via the UI element 410. The circuitry 202A may compare the entered password (or the hash of the entered password generated at "T-3") with the pre-stored password (or the hash of the pre-stored password). The circuitry 202A may determine, based on the comparison, that the entered password in the second user input corresponds to the pre-stored password. For example, the hash of the entered password generated at "T-3" may match the hash of the pre-stored password. The circuitry 202A may further determine the count of the received set of user inputs that corresponds to the pre-stored password. The count may be determined as "2" (since the first user input and the second user input may correspond to the pre-stored password). The count (i.e., determined as "2" at "T-3") of the received set of user inputs may be determined as equal to the predefined number (i.e., "2"). Thus, in such scenario, the hash of the count may match the hash of the predefined number. The circuitry 202A may authenticate the user 112 based on the match.

At a time instance "T-4" (after the time instance "T-3"), the circuitry 202A may be configured to control the user authentication client 402 to render authentication information 412, based on the authentication of the user 112. The user authentication client 402 may render a message, such as, "Authentication is Successful", as the authentication information 412.

It should be noted that the scenario 400A of FIG. 4A is for exemplary purposes and should not be construed to limit the scope of the disclosure.

Figure 4B:
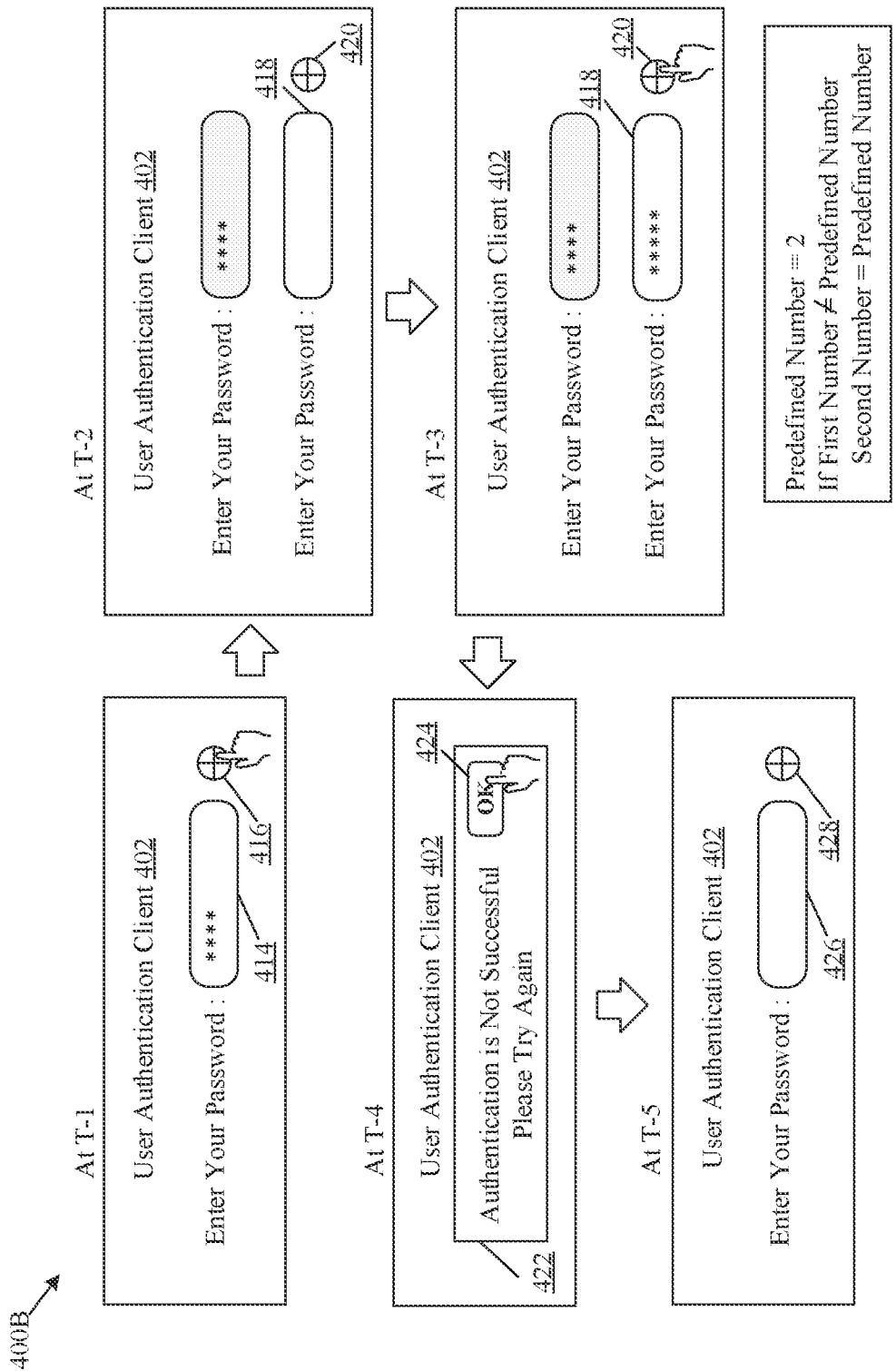
FIG. 4B is a diagram that illustrates an exemplary scenario for re-initiation of user authentication based on entry of an incorrect password via a user authentication client, in accordance with an embodiment of the disclosure.

FIG. 4B is a diagram that illustrates an exemplary scenario for re-initiation of user authentication based on entry of an incorrect password via a user authentication client, in accordance with an embodiment of the disclosure. FIG. 4B is explained in conjunction with elements from FIG. 1, FIG. 2A, FIG. 2B, FIG. 3, and FIG. 4A. With reference to FIG. 4B, there is shown an exemplary scenario 400B. In the exemplary scenario 400B, there is shown the UI of the user authentication client 402, that may be included in the electronic device 102. The UI of the user authentication client 402 may include UI elements for reception of a set of user inputs that correspond to passwords entered by the user 112. By way of an example, but not limitation, the pre-stored password may be "ABCD", the set of user inputs may include two user inputs, and the predefined number associated with the pre-stored password may be set as "2". The user 112 may be required to re-initiate the user authentication based on entry of an incorrect password.

At a time instance "T-1", the circuitry 202A may control the user authentication client 402 to render a UI element 414 (for example, a textbox) and a UI element 416 (for example, a button). The UI element 414 may enable the user 112 to enter a first user input, of the set of user inputs, that corresponds to an entered password, and the UI element 416 may enable the user 112 to submit the first user input. The user 112 may click or press the UI element 416 to transmit the submit user input. The circuitry 202A may receive the first user input based on a reception of the click input (or the button press input), via the UI element 416. The circuitry 202A may determine, based on a comparison of the entered password (or the hash of the entered password generated at "T-1") in the first user input and the pre-stored password (or the hash of the pre-stored password), that the entered password in the first user input corresponds to the pre-stored password. In case, the first user input corresponds to an entry of a correct password, the hash of the entered password generated at "T-1" may match the hash of the pre-stored password.

At a time instance "T-2" (after the time instance "T-1"), the circuitry 202A may control the user authentication client 402 to render a UI element 418 (for example, a textbox) and a UI element 420 (for example, a button). The control may be based on the comparison (performed at "T-1") and a count of the received set of user inputs that corresponds to the pre-stored password. The count may be determined as "1", which may be less than the predefined number (e.g., "2", as shown in FIG. 4B). Thus, the user 112 may be required to enter the correct password (i.e., the prestored password), once again, in a second user input for the authentication of the user 112. The UI element 418 may enable the user 112 to enter the second user input and the UI element 420 may enable the user 112 to submit the second user input.

At a time instance "T-3" (after the time instance "T-2"), the user 112 may enter, via the UI element 418, the second user input that corresponds to an entered password. The user 112 may click (or press) the UI element 420 to submit the second user input. The circuitry 202A may receive the second user input based on a reception of the click input (or the button press input), via the UI element 420. The circuitry 202A may determine, based on a comparison of the entered password (or the hash of the entered password generated at "T-3") and the pre-stored password (or the hash of the pre-stored password), that the entered password in the second user input does not correspond to the pre-stored password. The circuitry 202A may not authenticate the user based on the mismatch between the entered password (or the hash of the entered password) and the pre-stored password (or the hash of the pre-stored password).

In accordance with an embodiment, the circuitry 202A may be further configured to determine a first number corresponding to a number of times that the entered password in the received set of user inputs corresponds to the pre-stored password. In current example scenario, the first number may be determined as "1", since the entered password in the first user input corresponds to the pre-stored password, while the second user input is not same as the pre-stored password (i.e., the correct password). The circuitry 202A may compare the determined first number and the retrieved predefined number. Based on the comparison, the circuitry 202A may determine that the first number (i.e., "1") is not equal to the predefined number (i.e., "2"). The circuitry 202A may further determine a second number based on the comparison of the determined first number (i.e., "1") and the retrieved predefined number (i.e., "2"). The second number may correspond to a number of times that the correct password may be required to be re-entered for the authentication of the user 112. In accordance with an embodiment, the second number may correspond to the predefined number (i.e., "2"). Thus, the second number may be equal to the predefined number (i.e., 2). The user 112 may be required to re-initiate the user authentication based on a re-entry of the correct password for the second number of times (e.g., the predefined number of times, in the current case).

At a time instance "T-4" (after the time instance "T-3"), the circuitry 202A may be configured to control the user authentication client 402 to render authentication information 422 and a UI element 424 (for example, a button). In the current scenario, as the authentication of the user 112 may not be successful, the authentication information 422 may include a message, such as, "Authentication is Not Successful-Please Try Again". The message may indicate that the user 112 may be required to reinitiate the authentication procedure. The circuitry 202A may receive a response, from the user 112, to the message via the UI element 424.

Based on the reception of the response, the circuitry 202A may control the user authentication client 402 to render, at a time instance "T-5" (after the time instance "T-4"), a UI element 426 (for example, a textbox) and a UI element 428 (for example, a button). The UI element 426 may enable the user 112 to re-enter a first user input of a set of user inputs that corresponds to an entered password. The UI element 428 may enable the user 112 to re-submit the first user input.

It should be noted that the scenario 400B of FIG. 4B is for exemplary purposes and should not be construed to limit the scope of the disclosure.

Figure 4C:
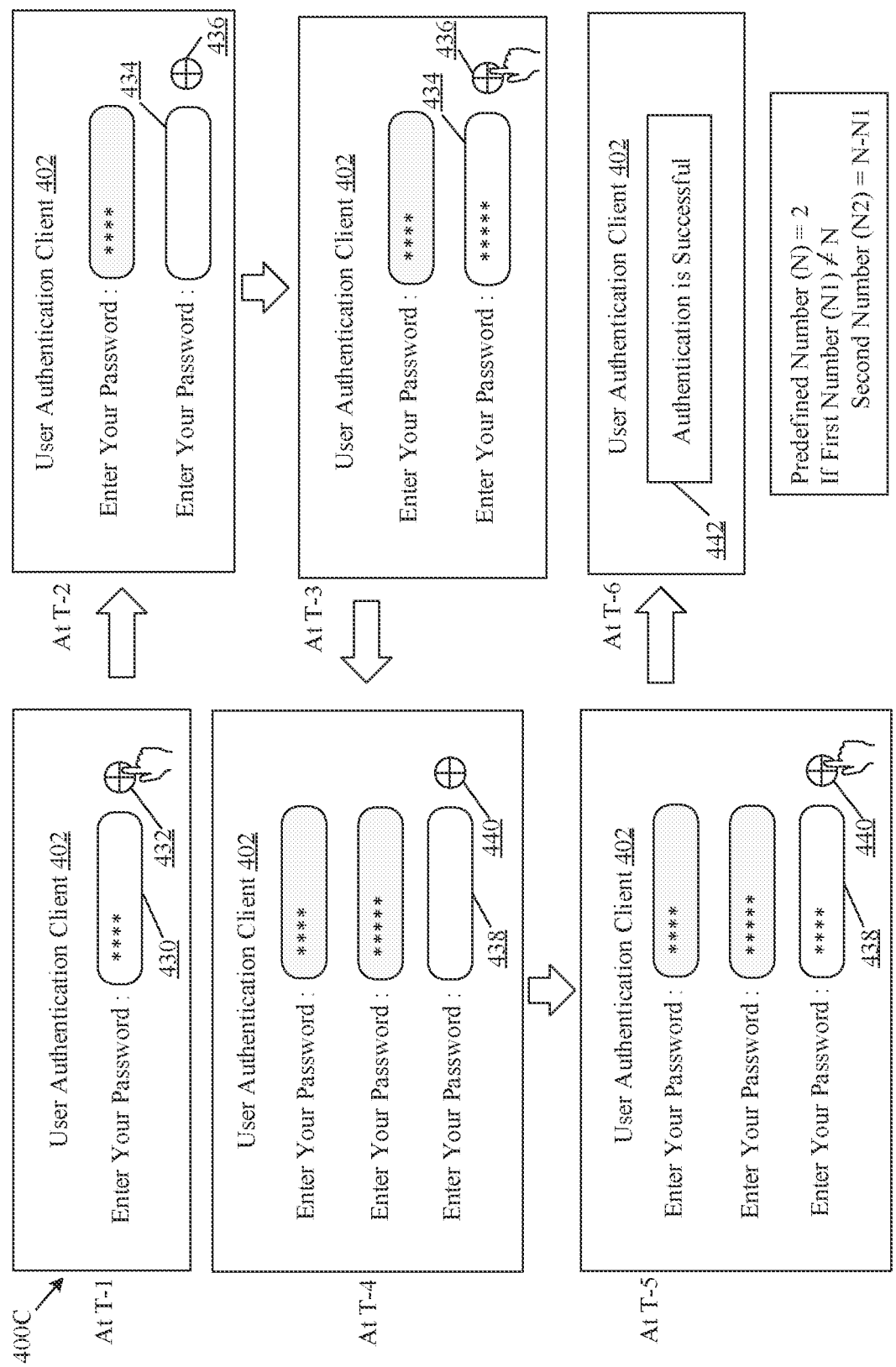
FIG. 4C is a diagram that illustrates an exemplary scenario for authentication of a user based on re-entry of passwords via a user authentication client, in accordance with an embodiment of the disclosure.

FIG. 4C is a diagram that illustrates an exemplary scenario for authentication of a user based on re-entry of passwords via a user authentication client, in accordance with an embodiment of the disclosure. FIG. 4C is explained in conjunction with elements from FIG. 1, FIG. 2A, FIG. 2B, FIG. 3, FIG. 4A, and FIG. 4B. With reference to FIG. 4C, there is shown an exemplary scenario 400C. In the exemplary scenario 400C, there is shown the UI of the user authentication client 402, that may be included in the electronic device 102. By way of an example, and not limitation, the pre-stored password (i.e., the correct password) may be "ABCD" and the predefined number (which may be denoted by "N") associated with the pre-stored password may be set as "2" (i.e., N=2). The UI of the user authentication client 402 may include UI elements for reception of a set of user inputs that correspond to passwords entered by the user 112. The user 112 may be authenticated based on a reception of "2" user inputs that include entered passwords that match the pre-stored password (i.e., the correct password).

At a time instance "T-1", the circuitry 202A may control the user authentication client 402 to render a UI element 430 (for example, a textbox) and a UI element 432 (for example, a button). The UI element 430 may enable the user 112 to enter a first user input of the set of user inputs that corresponds to an entered password and the UI element 432 may enable the user 112 to submit the first user input. The user 112 may click (or press) the UI element 432 to transmit the submit user input. The circuitry 202A may receive the first user input based on a reception of the click via the UI element 432. The circuitry 202A may determine, based on a comparison of the entered password (or the hash of the entered password generated at "T-1") in the first user input and the pre-stored password (or the hash of the pre-stored password), that the entered password in the first user input corresponds to the pre-stored password.

At a time instance "T-2" (after the time instance "T-1"), the circuitry 202A may control the user authentication client 402 to render a UI element 434 (for example, a textbox) and a UI element 436 (for example, a button). The control may be based on the comparison (performed at "T-1") and a count of the received set of user inputs that corresponds to the pre-stored password. The count may be determined as "1", which may be less than the predefined number (i.e., "2" as shown in FIG. 4C). Thus, the user 112 may be required to enter the correct password (i.e., the prestored password), via a second user input, for the authentication of the user 112. The UI element 434 may enable the user 112 to enter the second user input and the UI element 436 may enable the user 112 to submit the second user input.

At a time instance "T-3" (after the time instance "T-2"), the user 112 may enter, via the UI element 434, the second user input that corresponds to an entered password. The user 112 may click (or press) the UI element 436 to submit the second user input. The circuitry 202A may receive the second user input based on a reception of the click input (or the button press input) via the UI element 436. The circuitry 202A may determine, based on a comparison of the entered password (or the hash of the entered password generated at "T-3") and the pre-stored password (or the hash of the pre-stored password), that the entered password in the second user input does not correspond to the pre-stored password. The hash of the entered password (generated at T-3) may not match the hash of the pre-stored password. The circuitry 202A may not authenticate the user 112, based on the mismatch between the hash of the entered password and the hash of the pre-stored password.

In accordance with an embodiment, the circuitry 202A may be further configured to determine the first number corresponding to a number of times that the entered password in the received set of user inputs corresponds to the pre-stored password. The first number (e.g., denoted by "N1") may be determined as 1 (i.e., N1=1), since the entered password in the first user input corresponds to the pre-stored password. The circuitry 202A may compare the determined first number and the retrieved predefined number. Based on the comparison, the circuitry 202A may determine that the first number (i.e., N1=1) is not equal to the predefined number (i.e., N=2). The circuitry 202A may further determine a second number (e.g., denoted by "N2") based on the comparison of the determined first number (i.e., N1=1) and the retrieved predefined number (i.e., N=2). The second number may correspond to a number of times the correct password is required to be re-entered for the authentication of the user 112.

In accordance with an embodiment, the second number may correspond to a difference between the predefined number (i.e., N=2) and the determined first number (i.e., N1=1). Thus, the second number may be determined as 1 (i.e., N2=N−N1=2−1=1). The user 112 may be required to enter the correct password (i.e., the pre-stored password) once for the authentication of the user 112). Based on the determination of the second number, the circuitry 202A may be configured to control the user authentication client 402 to render, at a time instance T-4 (after the time instance "T-3"), a UI element 438 (for example, a textbox) and a UI element 440 (for example, a button). The UI element 438 may enable the user 112 to enter a third user input that corresponds to an entered password. The UI element 440 may enable the user 112 to submit the third user input.

At a time instance "T-5" (after the time instance "T-4"), the user 112 may enter, via the UI element 438, the third user input that corresponds to an entered password. The user 112 may click or press the UI element 440 to submit the third user input. The circuitry 202A may receive the third user input based on a reception of the click via the UI element 440. The circuitry 202A may determine, based on a comparison of the entered password (or the hash of the entered password generated at "T-5") and the pre-stored password (or the hash of the pre-stored password), that the entered password in the third user input corresponds to the pre-stored password. The hash of the entered password (generated at "T-5") may match the hash of the pre-stored password. The circuitry 202A may further determine the count of the received set of user inputs that corresponds to the pre-stored password. The count may be determined as "2" (since the first and third user inputs correspond to the pre-stored password). The count (i.e., 2 at "T-5") of the received set of user inputs may be determined as equal to the predefined number (i.e., "2"). The hash of the count may match the hash of the predefined number. The circuitry 202A may authenticate the user 112 based on the match.

At a time instance "T-6" (after the time instance "T-5"), the circuitry 202A may be configured to control the user authentication client 402 to render authentication information 442, based on the authentication of the user 112. The user authentication client 442 may render a message, such as, "Authentication is Successful", as the authentication information 442.

It should be noted that the scenario 400C of FIG. 4C is for exemplary purposes and should not be construed to limit the scope of the disclosure.

Figure 4D:
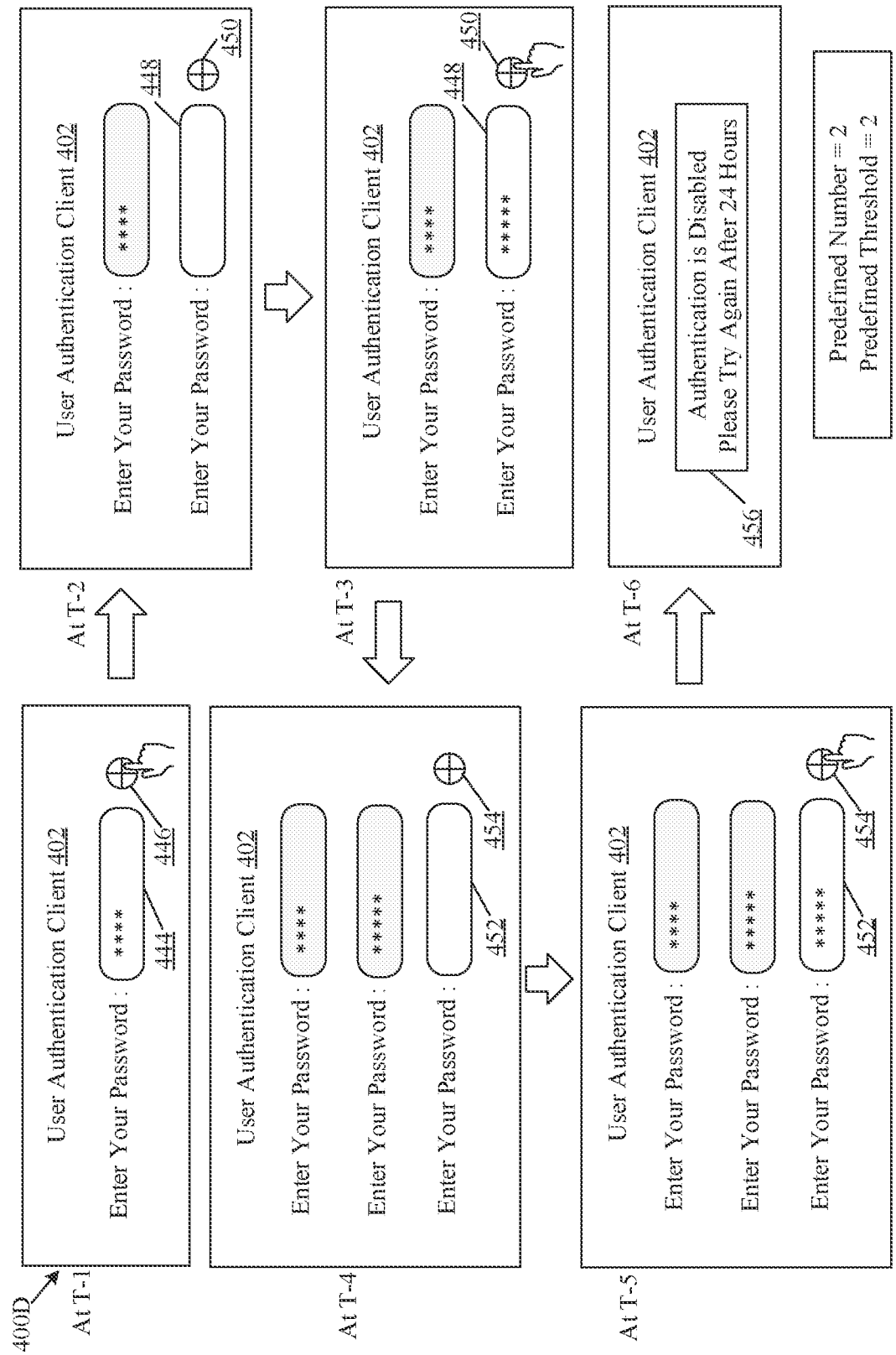
FIG. 4D is a diagram that illustrates an exemplary scenario for disabling of user authentication based on incorrect entries of a password via a user authentication client, in accordance with an embodiment of the disclosure.

FIG. 4D is a diagram that illustrates an exemplary scenario for disabling of user authentication based on entries of a wrong password via a user authentication client, in accordance with an embodiment of the disclosure. FIG. 4D is explained in conjunction with elements from FIG. 1, FIG. 2A, FIG. 2B, FIG. 3, FIG. 4A, FIG. 4B, and FIG. 4C. With reference to FIG. 4D, there is shown an exemplary scenario 400D. In the exemplary scenario 400D, there is shown the UI of the user authentication client 402, that may be included in the electronic device 102. By way of an example, and not limitation, the pre-stored password (i.e., the correct password) may be "ABCD" and the predefined number associated with the pre-stored password may be set as 2. The UI of the user authentication client 402 may include UI elements for reception of a set of user inputs that correspond to passwords entered by the user 112. The user authentication client 402 may disable authentication of the user 112 based on a count of entries of a wrong password and a predefined threshold. The predefined threshold may be set as "2".

At a time instance "T-1", the circuitry 202A may control the user authentication client 402 to render a UI element 444 (for example, a textbox) and a UI element 446 (for example, a button). The UI element 444 may enable the user 112 to enter a first user input of the set of user inputs that corresponds to an entered password and the UI element 446 may enable the user 112 to submit the first user input. The user 112 may click or press the UI element 446 to transmit the submit user input. The circuitry 202A may receive the first user input based on a reception of the click input (or the button press input) via the UI element 446. The circuitry 202A may determine, based on a comparison of the entered password (or the hash of the entered password generated at "T-1") in the first user input and the pre-stored password (or the hash of the pre-stored password), that the entered password in the first user input corresponds to the pre-stored password. The hash of the entered password generated at "T-1" may match the hash of the pre-stored password.

At a time instance "T-2" (after the time instance "T-1"), the circuitry 202A may control the user authentication client 402 to render a UI element 448 (for example, a textbox) and a UI element 450 (for example, a button). The control may be based on the comparison (performed at "T-1") and a count of the received set of user inputs that corresponds to the pre-stored password. The count may be determined as "1", which may be less than the predefined number (i.e., 2). Thus, the user 112 may be required to enter the correct password (i.e., the prestored password) via a second user input for the authentication of the user 112. The UI element 448 may enable the user 112 to enter the second user input and the UI element 450 may enable the user 112 to submit the second user input.

At a time instance "T-3", the user 112 may enter, via the UI element 448, the second user input that corresponds to an entered password. The user 112 may click or press the UI element 450 to submit the second user input. The circuitry 202A may receive the second user input based on a reception of the click via the UI element 450. The circuitry 202A may determine, based on a comparison of the entered password (or the hash of the entered password generated at "T-3") and the pre-stored password (or the hash of the pre-stored password), that the entered password in the second user input does not correspond to the pre-stored password. The hash of the entered password (generated at T-3) may not match the hash of the pre-stored password.

In accordance with an embodiment, the circuitry 202A may be further configured to determine a count of user inputs of the received set of user inputs that correspond to an entry of a wrong password (i.e., a count of the user inputs that do not correspond to the pre-stored password). The count may be determined as "1", since the second user input of the received set of user inputs does not correspond to the pre-stored password. The circuitry 202A may be further configured to disable the authentication of the user 112 based on the determined count of the user inputs and the predefined threshold. The authentication of the user 112 may be disabled if the determined count is equal to the predefined threshold. The count (i.e., 1 at "T-3") may be determined as less than the predefined threshold (i.e., 2). Therefore, the circuitry 202A may continue with the user authentication process and enable the user 112 to provide one or more additional user inputs.

In accordance with an embodiment, the circuitry 202A may be further configured to determine a first number as "1", as a count of user inputs corresponding to the correct password entry (as the entered password in the first user input corresponds to the pre-stored password, hence, the first number is 1). The circuitry 202A may compare the determined first number and the retrieved predefined number. Based on the comparison, the circuitry 202A may determine that the first number (i.e., 1) is not equal to the predefined number (i.e., 2). The circuitry 202A may further determine a second number based on the comparison of the determined first number (i.e., 1) and the retrieved predefined number (i.e., 2). In accordance with an embodiment, the second number may correspond to a difference between the predefined number (i.e., 2) and the determined first number (i.e., 1). Thus, the second number may be determined as "1". Based on the determination of the second number, the circuitry 202A may be configured to control the user authentication client 402 to render, at a time instance "T-4" (after the time instance "T-3"), a UI element 452 (for example, a textbox) and a UI element 454 (for example, a button). The UI element 452 may enable the user 112 to enter a third user input that corresponds to an entered password. The UI element 454 may enable the user 112 to submit the third user input.

At a time instance "T-5" (after the time instance "T-4"), the user 112 may enter, via the UI element 452, the third user input that corresponds to an entered password. The user 112 may click or press the UI element 454 to submit the third user input. The circuitry 202A may receive the third user input based on a reception of the click input (or the button press input) via the UI element 454. The circuitry 202A may determine, based on a comparison of the entered password (or the hash of the entered password generated at "T-5") and the pre-stored password (or the hash of the pre-stored password), that the entered password in the third user input does not correspond to the pre-stored password. The hash of the entered password (generated at "T-5") may not match the hash of the pre-stored password. In accordance with an embodiment, the circuitry 202A may be further configured to determine the count of user inputs of the received set of user inputs that correspond to the entry of the wrong password (i.e., the count of the user inputs that do not correspond to the pre-stored password). The count may be determined as "2", since the second and third user inputs of the received set of user inputs do not correspond to the pre-stored password. The authentication of the user 112 may be disabled since the determined count (i.e., 2 at "T-5") of wrong password entry may be equal to the predefined threshold (i.e., 2).

At a time instance "T-6" (after the time instance "T-5"), the circuitry 202A may be configured to control the user authentication client 402 to render authentication information 456. For example, the authentication information 456 may include a message, such as, "Authentication is Disabled-Please Try Again After 24 Hours". The user 112 may need to re-initiate the authentication process based on the message.

In some embodiments, the circuitry 202A may be further configured to update the retrieved predefined number (i.e., 2) based on the determined count (i.e., 2) of the user inputs, of the received set of user inputs, that correspond to the entry of the wrong password, and also on the predefined threshold (i.e., 2). The predefined number may be updated if the determined count is equal to the predefined threshold. For example, the predefined number may be updated from "2" to "3" since the determined count (i.e., "2" at "T-6") of the wrong password entry may be equal to the predefined threshold (i.e., 2). The circuitry 202A may transmit the updated predefined number to a secured location (for example, a mail server or a cloud server) that may be accessible to the user 112 based on authentication of the user 112.

It should be noted that the scenario 400D of FIG. 4D is for exemplary purposes and should not be construed to limit the scope of the disclosure. It may be observed that the user authentication client 402 may not indicate the number of passwords that the user 112 may be required to enter for successful authentication. The user authentication client 402 may not indicate, if the user authentication fails or is disabled, whether cause of authentication failure is entry of an incorrect password, or entry of a correct password for the number of times that is not equal to the predefined number. Such a scheme of password re-entry may strengthen the user authentication process and ensure that the secured assets and resources may not be subject to cyber-crime incidents due to hacked passwords through brute force or other traditional hacking methods.

Figure 5A:
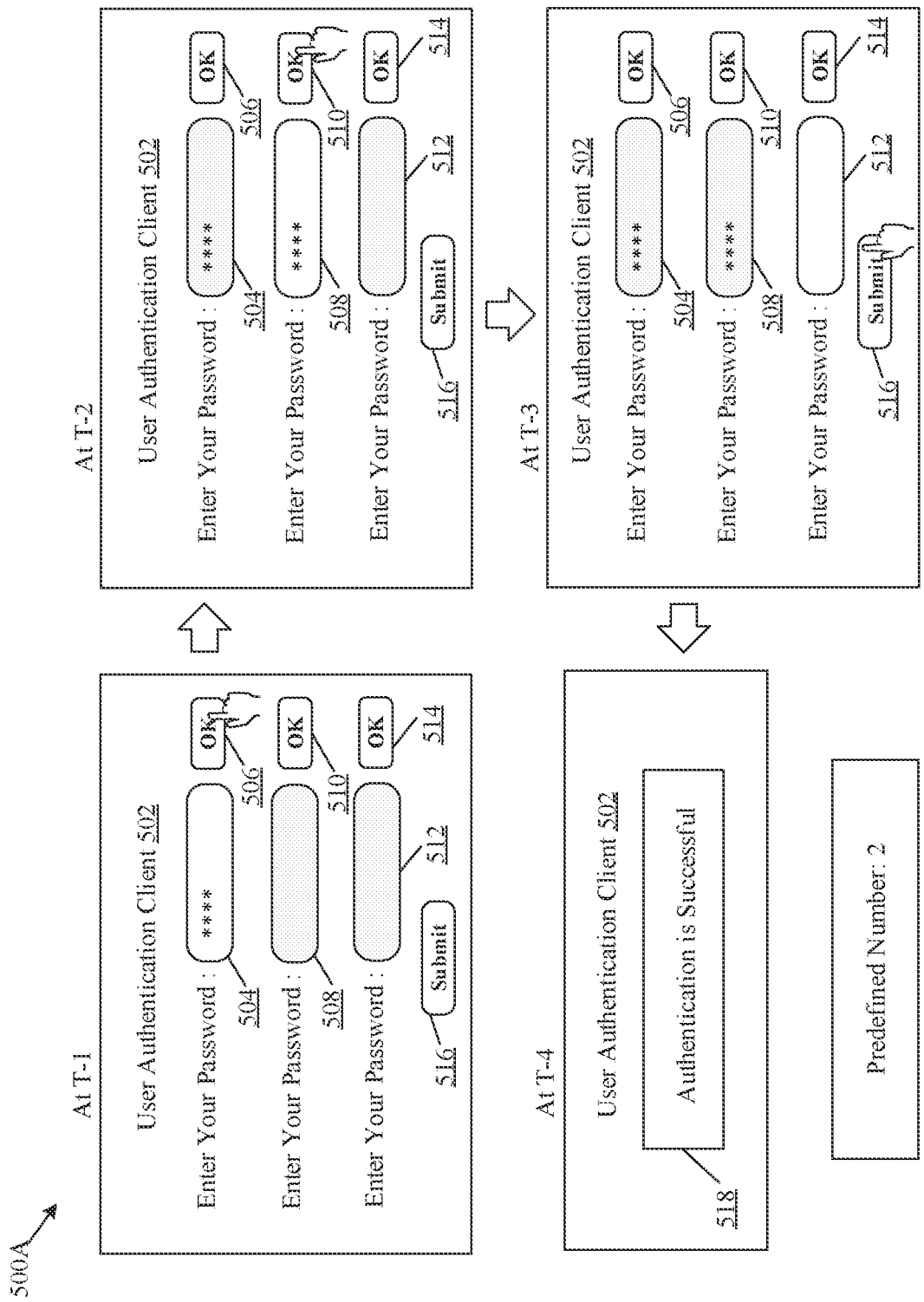
FIGS. 5A, 5B, and 5C are diagrams that illustrate exemplary scenarios for authentication of a user based on re-entry of passwords via a user authentication client, in accordance with an embodiment of the disclosure.
Figure 5B:
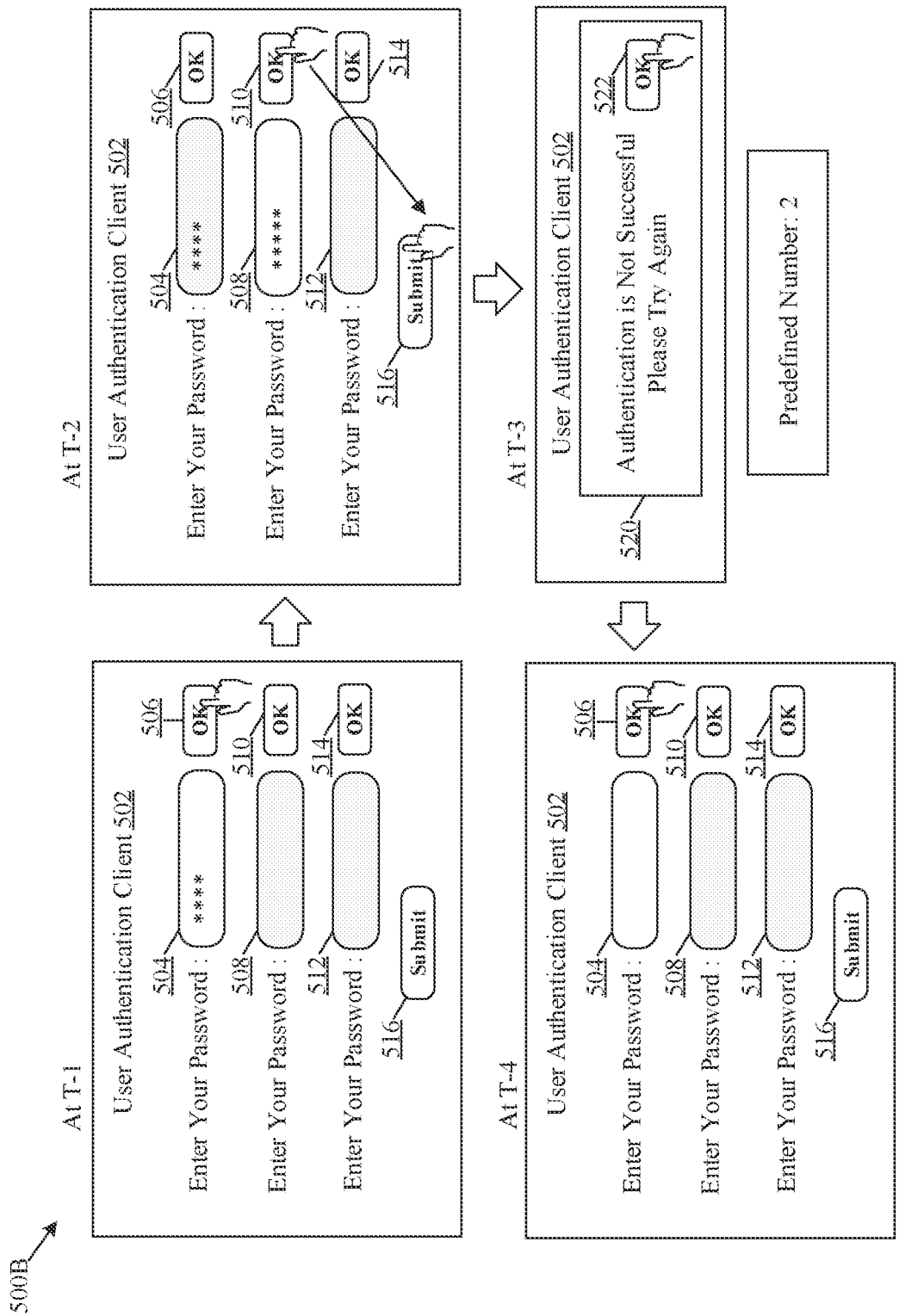
Figure 5C:
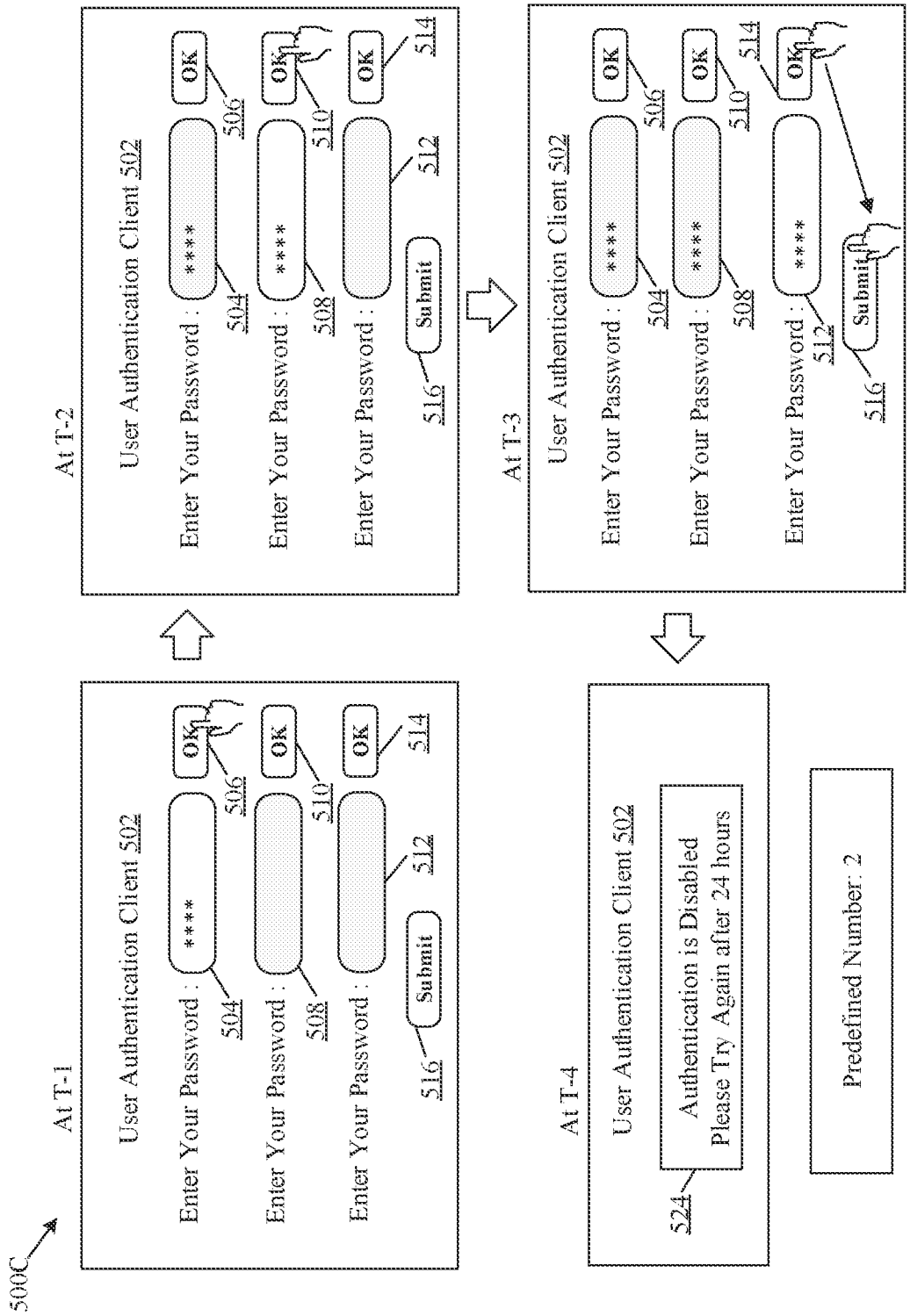

FIGS. 5A, 5B, and 5C are diagrams that illustrates exemplary scenarios for authentication of a user based on re-entry of passwords via a user authentication client, in accordance with an embodiment of the disclosure. FIGS. 5A, 5B, and 5C are explained in conjunction with elements from FIG. 1, FIG. 2A, FIG. 2B, FIG. 3, FIG. 4A, FIG. 4B, FIG. 4C, and FIG. 4D. With reference to FIG. 5A, there is shown an exemplary scenario 500A. In the exemplary scenario 500A, there is shown a User Interface (UI) of a user authentication client 502, that may be included in the electronic device 102. The user authentication client 502 may be a software that comprises program instructions executable on the electronic device 102 by the circuitry 202A to authenticate the user 112. The circuitry 202A may receive, via the user authentication client 502, a set of user inputs that correspond to a set of entered texts associated with the user 112. The UI of the user authentication client 502 may include UI elements for reception of the set of entered texts. The circuitry 202A may authenticate the user 112 based on comparisons between each entered text of the set of entered texts and a pre-stored password associated with the user 112.

In accordance with an embodiment, the pre-stored password may correspond to a password set by the user 112 via the user authentication client 502. A count of the set of entered texts may correspond to the retrieved predefined number. Therefore, the comparison between each entered text of the set of entered texts and the pre-stored password may be performed for the predefined number of times. The user 112 may be required to enter a correct password (i.e., the pre-stored password) as a text for the predefined number of times for the successful authentication of the user 112.

By way of an example, and not limitation, the pre-stored password (i.e., the password set by the user 112) may be "ABCD". The set of user inputs may include two user inputs that correspond to two entered texts. The set of entered texts may include the two entered texts (for example, a first text and a second text). The entered texts may correspond to a password associated with the user 112. The predefined number associated with the pre-stored password may be set as "2". The user 112 may be required to enter the correct password (i.e., the pre-stored password) twice (as the first text and the second text) for the authentication of the user 112. The circuitry 202A may control the user authentication client 502 to render UI elements 504, 506, 508, 510, 512, 514, and 516. The user 112 may enter texts using the UI elements 504, 508, and 512 (for example, text boxes). The user 112 may submit the entered texts using the UI elements 506, 510, 514, (for example, buttons "OK") and 516 (for example, button "Submit").

At a time instance "T-1", the circuitry 202A may control the user authentication client 502 to enable the UI element 504 to accept entry of a text by the user 112. The user 112 may enter the first text that corresponds to a password. The user 112 may click (or press) the UI element 506 to send the first text that corresponds to the password. The circuitry 202A may receive the first text based on a reception of the click input (or the button press input) via the UI element 506. The circuitry 202A may compare the password (or the hash of the password generated at "T-1") with the pre-stored password (or the hash of the pre-stored password). The circuitry 202A may determine, based on the comparison, that the first text corresponds to the pre-stored password. The hash of the password generated at "T-1" may match the hash of the pre-stored password.

Based on the match, the circuitry 202A may control the user authentication client 502 to enable, at a time instance "T-2" (after the time instance "T-1"), the UI element 508 to accept entry of another text by the user 112. The user 112 may enter a second text that corresponds to a password. The user 112 may click or press the UI element 510 to submit the second text that corresponds to the password. The circuitry 202A may receive the second text based on a reception of the click input (or a button press input) via the UI element 510. The circuitry 202A may compare the password (or the hash of the password generated at "T-2") with the pre-stored password (or the hash of the pre-stored password). The circuitry 202A may determine, based on the comparison, that the second text corresponds to the pre-stored password. The hash of the password generated at "T-2" may match the hash of the pre-stored password.

Based on the match, the circuitry 202A may control the user authentication client 502 to enable, at a time instance "T-3" (after the time instance "T-2"), the UI element 512 to accept entry of a text by the user 112. Though the UI element 512 (i.e., the corresponding textbox) may be enabled, a genuine user may not enter any text (which may or may not be the password) via the UI element 512. This may be because the genuine user may be aware that the predefined number is "2" and the user has already entered the password (i.e., considering that a correct password has been entered) twice. In such case, the UI element 512 may act as a decoy to mislead hackers to enter a password again (i.e., like correct password again), which may thereby provide an additional layer of security to the resource that may be secured by the password mechanism. The genuine user (e.g., the user 112) may click or press the UI element 516 (e.g., a submit button) to submit the set of user inputs, including all the passwords entered by the user 112. The circuitry 202A may compare the entered password in each of the set of user inputs with the pre-stored password. Further, the circuitry 202A may compare the count of the set of user inputs with the pre-defined number. Based on both the comparisons, the circuitry 202A may authenticate the user 112.

At a time instance "T-4" (after the time instance "T-3"), the circuitry 202A may be configured to control the user authentication client 502 to render authentication information 518, based on the authentication of the user 112. The user authentication client 502 may render a message, such as, "Authentication is Successful" as the authentication information 518.

It should be noted that the scenario 500A of FIG. 5A is for exemplary purposes and should not be construed to limit the scope of the disclosure.

With reference to FIG. 5B, there is shown an exemplary scenario 500B. In the exemplary scenario 500B, there is shown the UI of the user authentication client 502, that may be included in the electronic device 102. The circuitry 202A may receive, via the user authentication client 502, a set of user inputs that correspond to a set of entered texts associated with the user 112. The UI of the user authentication client 502 may include UI elements for reception of the set of entered texts.

At a time instance "T-1", the circuitry 202A may control the user authentication client 502 to enable the UI element 504 to accept entry of a text by the user 112. The user 112 may enter the first text that corresponds to a password. The circuitry 202A may determine, based on a comparison of the password (or the hash of the password generated at "T-1") and the pre-stored password (or the hash of the pre-stored password), that the first text corresponds to the pre-stored password. The hash of the password generated at "T-1" may match the hash of the pre-stored password. Based on the match, the circuitry 202A may control the user authentication client 502 to enable, at a time instance "T-2" (after the time instance "T-1"), the UI element 508 to accept entry of a text by the user 112. The user 112 may enter the second text that corresponds to a password. The circuitry 202A may receive the second text (entered by the user 112 using the UI element 508) based on a reception of a click input or a button press input (from the user 112) via the UI element 510. The circuitry 202A may determine, based on a comparison of the password (or the hash of the password generated at "T-2") and the pre-stored password (or the hash of the pre-stored password), that the second text does not correspond to the pre-stored password. The hash of the password generated at "T-2" may not match the hash of the pre-stored password. The circuitry 202A may further receive a user input (from the user 112) via the UI element 516.

Based on the received user input, the circuitry 202A may determine whether the count of the set of entered texts corresponds to the predefined number (i.e., 2). The count of the set of entered texts may be determined as "2" based on the reception of the first text and the second text. The circuitry 202A may not authenticate the user 112 based on a mismatch between the second text and the pre-stored password. The user 112 may be required to re-initiate the user authentication since the correct password (i.e., the pre-stored password) may be required to be entered twice (as the first text and the second text) or the predefined number of times (i.e., 2), for the authentication of the user 112.

At a time instance "T-3" (after the time instance "T-2"), the circuitry 202A may be configured to control the user authentication client 502 to render authentication information 520 and a UI element 522 (for example, a button). The authentication information 520 may include a message, such as, "Authentication is Not Successful-Please Try Again". The message may indicate that the user 112 may be required to reinitiate the authentication procedure. The circuitry 202A may receive a response, from the user 112, to the message via the UI element 522.

Based on the reception of the response, at a time instance "T-4" (after the time instance "T-3"), the circuitry 202A may control the user authentication client 502 to enable the UI element 504 to accept a re-entry of the first text by the user 112. The user authentication client 502 may enable the user 112 to re-submit the first text by use of the UI element 506.

It should be noted that the scenario 500B of FIG. 5B is for exemplary purposes and should not be construed to limit the scope of the disclosure.

With reference to FIG. 5C, there is shown an exemplary scenario 500C. In the exemplary scenario 500C, there is shown the UI of the user authentication client 502, that may be included in the electronic device 102. The circuitry 202A may receive, via the user authentication client 502, a set of user inputs that correspond to a set of entered texts associated with the user 112. The UI of the user authentication client 502 may include UI elements for reception of the set of entered texts.

At a time instance "T-1", the circuitry 202A may control the user authentication client 502 to enable the UI element 504 to accept entry of a text. The first text may correspond to a password. The circuitry 202A may determine that the entered password corresponds to the pre-stored password. The hash of the password generated at "T-1" may match the hash of the pre-stored password. Based on whether the first text matches the pre-stored password, the circuitry 202A may control the user authentication client 502 to enable, at a time instance "T-2" (after the time instance "T-1"), the UI element 508 to accept entry of a text. The circuitry 202A may receive the second text (entered using the UI element 508) based on a reception of a click via the UI element 510. The second text may correspond to a password. The circuitry 202A may determine that the password corresponds to the pre-stored password. The hash of the password generated at "T-2" may match the hash of the pre-stored password.

Based on a match of the second text with the pre-stored password, the circuitry 202A may control the user authentication client 502 to enable, at a time instance "T-3" (after the time instance "T-2"), the UI element 512 to accept entry of a text. The circuitry 202A may receive a third text (entered using the UI element 512) based on a reception of a click via the UI element 514. The third text may correspond to a password. The circuitry 202A may determine that the password corresponds to the pre-stored password. The hash of the password generated at "T-3" may match the hash of the pre-stored password. The circuitry 202A may receive a user input via the UI element 516. Based on the received user input, the circuitry 202A may determine whether the count of the received set of entered texts corresponds to the predefined number (i.e., "2"). The count of the set of entered texts may be determined as "3", based on the reception of the first text, the second text, and the third text. The circuitry 202A may be further configured to disable user authentication since the count of the set of entered texts is greater than the predefined number. The circuitry 202A may determine that the received set of user inputs may have been entered by an unauthorized user (who may not be aware of the pre-defined number).

At a time instance "T-4", the circuitry 202A may be configured to control the user authentication client 502 to render authentication information 524. The authentication information 524 may include a message, such as, "Authentication is Disabled-Please Try Again After 24 Hours". The user 112 may need to re-initiate the authentication based on the message.

In some embodiments, the circuitry 202A may be further configured to update the retrieved predefined number (i.e., 2) based on the determined count of the received set of entered texts. The predefined number may be updated if the determined count is not equal to the predefined number. For example, the predefined number may be updated from "2" to "4" since the determined count (i.e., "3" at "T-3") of the received set of entered texts is not equal to the predefined threshold (i.e., "2"). The circuitry 202A may transmit the updated predefined number to a secured location (for example, a mail server or a cloud server) that may be accessible to the user 112 based on authentication of the user 112.

It should be noted that the scenario 500C of FIG. 5C is for exemplary purposes and should not be construed to limit the scope of the disclosure. It may be observed that the user authentication client 502 may not indicate the number of passwords that the user 112 may be required to enter for successful authentication. On the other hand, the rendered number of UI elements that may be used for entry of a password may be greater than the predefined number. This may confuse a malicious user as to what could be the correct number of times the correct password needs to be entered for user authentication. Moreover, the user authentication client 502 may not indicate, if the user authentication fails or is disabled, whether cause of authentication failure is entry of an incorrect password or entry of a correct password for the number of times that is not equal to the predefined number. This may prevent the malicious user to gain access of the password or the predefined number.

Figure 6:
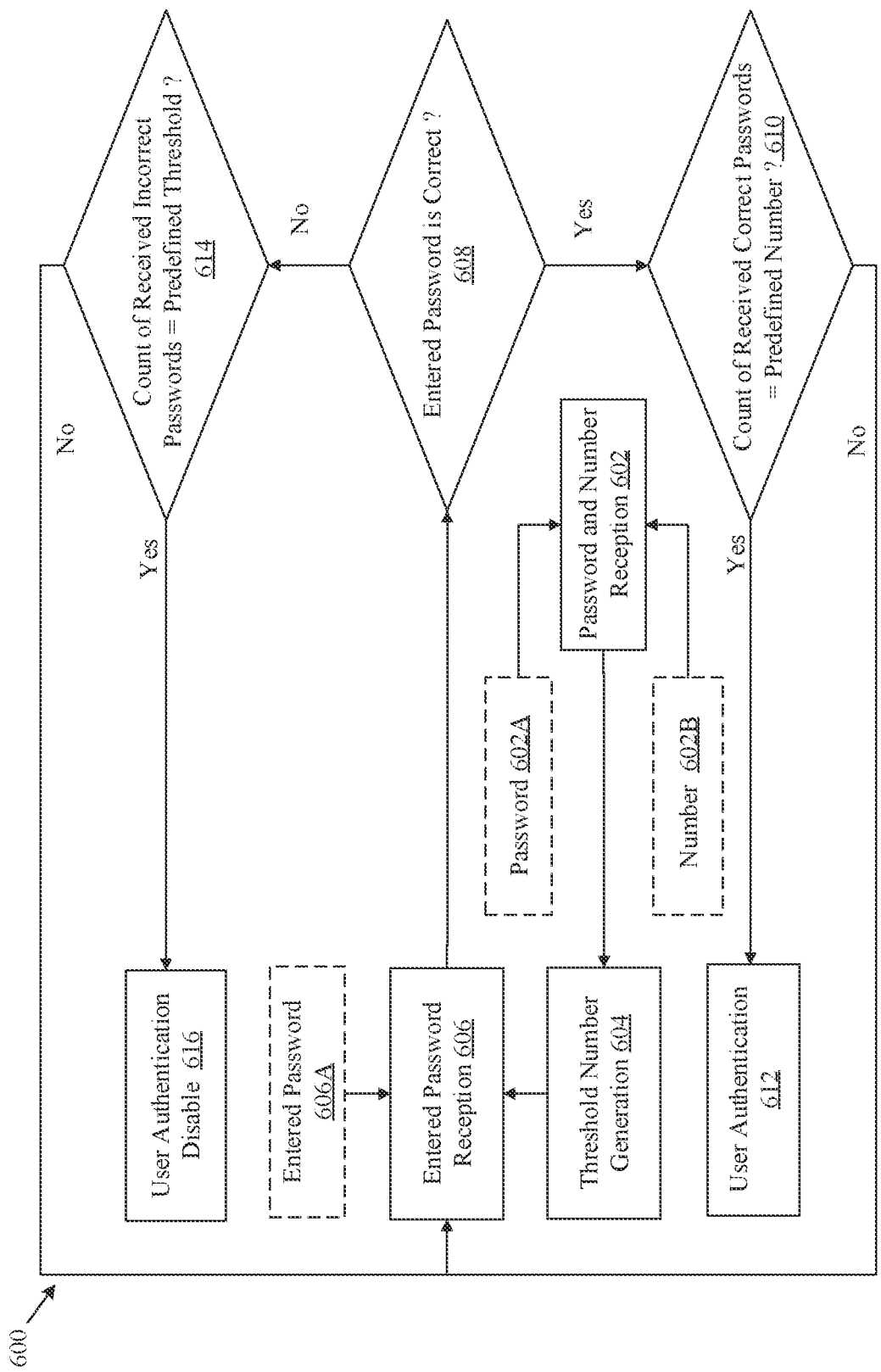
FIG. 6 is a diagram that illustrates an exemplary execution pipeline for authentication of a user based on re-entry of passwords, in accordance with an embodiment of the disclosure.

FIG. 6 is a diagram that illustrates an exemplary execution pipeline for authentication of a user based on re-entry of passwords, in accordance with an embodiment of the disclosure. FIG. 6 is explained in conjunction with elements from FIG. 1, FIG. 2A, FIG. 2B, FIG. 3, FIG. 4A, FIG. 4B, FIG. 4C, FIG. 4D, FIG. 5A, FIG. 5B, and FIG. 5C. With reference to FIG. 6, there is shown an exemplary execution pipeline 600. The exemplary execution pipeline 600 may include a set of operations (for example, operations 602 to 614) that may be executed by one or more components of FIG. 1, such as, the electronic device 102. The set of operations may be performed by the circuitry 202A of the electronic device 102 to authenticate the user 112 based on a reception of a set of inputs from the user 112 that correspond to a password entered by the user 112.

At 602, a password 602A and a number 602B may be received. In accordance with an embodiment, the circuitry 202A may be configured to receive the password 602A and the number 602B. For example, the received password may be "ABCD", and the received number may be "4". The user 112 may be required to enter a correct password (for example, "ABCD") for a predefined number (i.e., the number 602B) of times (for example, 4 times) for authentication of the user 112. The circuitry 202A may be further configured to generate a hash of the password 602A and a hash of the number 602B. The hash of the password 602A and the hash of the number 602B may be stored in the memory 204A. The password 602A may correspond to the pre-stored password associated with the user 112. The number 602B may correspond to the predefined number associated with the pre-stored password.

At 604, a threshold number may be generated. In accordance with an embodiment, the circuitry 202A may be configured to generate the threshold number. For example, the threshold number may be "2". The threshold number may correspond to the predefined threshold. The circuitry 202A may disable user authentication if a count of received incorrect passwords is equal to the predefined threshold (for example, "2"), as described, for example, in FIG. 4D.

At 606, an entered password 606A may be received. In accordance with an embodiment, the circuitry 202A may be configured to receive the entered password 606A. The entered password 606A may correspond to a received user input of a received set of user inputs. Based on a reception of the entered password 606A, the circuitry 202A may be configured to retrieve the pre-stored password (e.g., the password 602A) associated with the user 112 and the predefined number (e.g., the number 602B) associated with the pre-stored password.

At 608, the entered password 606A may be verified with the retrieved pre-stored password. In accordance with an embodiment, the circuitry 202A may be configured to verify whether the entered password 606A corresponds to the pre-stored password. The verification may be based on a comparison of the entered password 606A and the pre-stored password. In some embodiments, the verification may be based on a comparison of a hash of the entered password 606A and the hash of the pre-stored password. The hash of the entered password 606A may be generated based on the reception of the entered password 606A.

The circuitry 202A may be configured to verify whether an entered password 606A is correct, at each instance of reception of an entered password 606A. In a first scenario, the circuitry 202A may determine, based on the comparison of the entered password 606A and the pre-stored password, that the entered password 606A is the correct password. The determination may indicate that the entered password 606A and the pre-stored password are same, or that there is a match between the hash of the entered password 606A and the hash of the pre-stored password. In case of the match between the entered password 606A and the pre-stored password, control may pass to 610.

In a second scenario (associated with the operation 608), the circuitry 202A may determine, based on the comparison of the entered password 606A and the pre-stored password, that the entered password 606A is incorrect. The comparison of the entered password 606A and the pre-stored password may indicate that the entered password 606A does not correspond to the pre-stored password, or the hash of the pre-stored password does not match the hash of the entered password 606A. In case of a determination that the entered password 606A is an incorrect password, (i.e., the entered password 606A is different from the pre-stored password), control may pass to 614.

At 610, a count of received correct passwords may be compared with the predefined number to determine whether the count of received correct passwords is equal to the predefined number (i.e., the number 602B). In accordance with an embodiment, the circuitry 202A may be configured to compare the count of received correct passwords with the predefined number. The circuitry 202A may be configured to initialize a first counter to track the count of received correct passwords. The first counter may be incremented at each instance of determination of match between the entered password 606A and the pre-stored password. The circuitry 202A may be configured to compare a value of the first counter with the predefined number at each instance of update of the first counter. Thus, the first counter may be incremented based on the match between the entered password 606A and the pre-stored password (determined at 608). The circuitry 202A may compare the incremented value of the first counter with the predefined number (i.e., the number 602B). In case, the count (i.e., the first counter) of the received correct passwords equals the predefined number, control may pass to 612 and the user 112 may be authenticated. Otherwise, in case the count (i.e., the first counter) of received correct passwords is less than the predefined number, control may pass to 606 and the user 112 may be prompted to provide another user input corresponding to a re-entry of a password, which may be then received by the circuitry 202A. The circuitry 202A may perform the operations 606, 608, and 610, in a loop till the "yes" condition of the operation 610 is satisfied and the "yes" condition of the operation 608 is also satisfied. The satisfaction of the "yes" condition of the operation 610 may enable performance of the operation 612 (i.e., authentication of the user 112).

At 612, the user 112 may be authenticated. In accordance with an embodiment, the circuitry 202A may be configured to authenticate the user 112 based on the count of received correct passwords. The user 112 may be authenticated based on the comparison, performed at 610, of the incremented value of the second counter (i.e., the count of received correct passwords) and the predefined number. The comparison may indicate that the count of received correct passwords is equal to the predefined number.

At 614, a count of received incorrect passwords may be compared with the predefined threshold to determine whether the count of received incorrect passwords is equal to the predefined threshold (i.e., the generated threshold number). In accordance with an embodiment, the circuitry 202A may be configured to compare the count of received incorrect passwords with the predefined threshold. The circuitry 202A may be configured to initialize a second counter to track the count of the received incorrect passwords. The second counter may be incremented at each instance of determination of a mismatch between the hash of the entered password 606A and the hash of the pre-stored password. The circuitry 202A may configured to compare a value of the second counter with the predefined threshold at each instance of incrementation of the second counter. Thus, the second counter may be incremented based on the indication that the entered password 606A does not correspond to the pre-stored password, or the hash of the pre-stored password does not match the hash of the entered password 606A. The circuitry 202A may compare the incremented value of the second counter with the predefined threshold.

In case it is determined that the count (i.e., the second counter) of the received incorrect passwords is less than the predefined threshold, control may pass to 606 and the user 112 may be prompted to provide another user input corresponding to a re-entry of a password, which may be then received by the circuitry 202A. However, in case it is determined that the count (i.e., the second counter) of the received incorrect passwords is equal to the predefined threshold, control may pass to 616 and the user authentication process may be disabled. The circuitry 202A may perform the operations 606, 608, and 614, in a loop till the "yes" condition of the operation 614 is satisfied and the "no" condition of the operation 608 is also satisfied. The satisfaction of the "yes" condition of the operation 614 may enable performance of the operation 616 (i.e., disable user authentication).

At 616, user authentication may be disabled. In accordance with an embodiment, the circuitry 202A may be configured to disable user authentication based on the count of received incorrect passwords. The user authentication may be disabled based on the comparison, performed at 614, of the incremented value of the second counter (i.e., the count of received incorrect passwords) and the predefined threshold. The comparison may indicate that the count of received correct passwords is equal to the predefined threshold.

Figure 7:
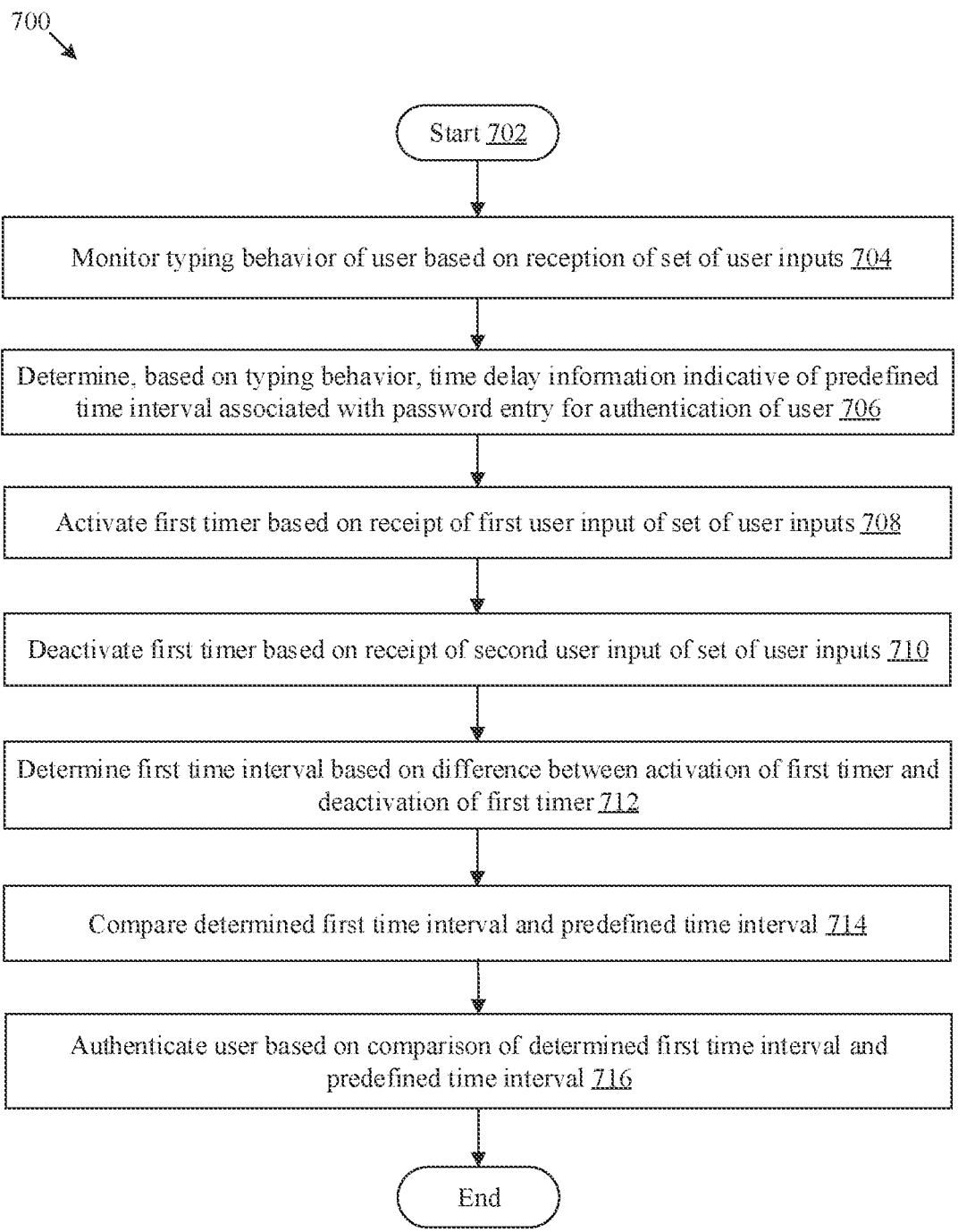
FIG. 7 is a flowchart that illustrates operations for an exemplary method for authentication of a user based on a typing behavior of the user, in accordance with an embodiment of the disclosure.

FIG. 7 is a flowchart that illustrates operations for an exemplary method for authentication of a user based on a typing behavior of the user, in accordance with an embodiment of the disclosure. FIG. 7 is explained in conjunction with elements from FIG. 1, FIG. 2A, FIG. 2B, FIG. 3, FIG. 4A, FIG. 4B, FIG. 4C, FIG. 4D, FIG. 5A, FIG. 5B, FIG. 5C, and FIG. 6. With reference to FIG. 7, there is shown a flowchart 700. The operations from 702 to 716 may be implemented by a computing system, such as, by the electronic device 102 of FIG. 1. The operations may start at 702 and may proceed to 704.

At 704, a typing behavior of the user 112 may be monitored based on a reception of the set of user inputs. In at least one embodiment, the circuitry 202A may be configured to monitor the typing behavior of the user 112 based on a reception of the set of user inputs. The typing behavior may include a time interval used, by the user 112, to enter a user input (i.e., a password associated with the user 112). The circuitry 202A may determine, at each instance of the reception of a user input, the time interval used to enter the user input. The circuitry 202A may generate a record, associated with the user 112, based on the time interval determined at each instance of the reception of user inputs during a monitoring period. The record may be indicative of variations in the time interval used to enter user inputs during the monitoring period. In an embodiment, each entry in the record may constitute a time interval used to enter a user input that corresponds to the correct password (i.e., the pre-stored password). The time interval used to enter a user input that does not correspond to the correct password may not be included in the record.

At 706, time delay information, indicative of a predefined time interval associated with a password entry for the authentication of the user 112, may be determined based on the monitored typing behavior. In at least one embodiment, the circuitry 202A may be configured to determine, based on the typing behavior, the time delay information that may be indicative of the predefined time interval associated with the password entry for the authentication of the user 112. The time delay information may correspond to the time interval used for entry of a user input (i.e., a password associated with the user 112). The predefined time interval may be determined based on the generated record of variations of the time interval used for entry of the password during the monitoring period. The record of variations may correspond to a variation of amount of time taken by the user 112 to enter user inputs during the monitoring period.

The variations in the time interval in the entries of the record may be based on inclusion of "entry of the password" as a user activity associated with the user 112. The time interval recorded (during the monitoring period) across entries may be stable if the "entry of the password" is frequently or consistently included in the user activity. On the other hand, the time interval recorded (during the monitoring period) across entries may have variations if the "entry of the password" is not included frequently or consistently in the user activity. In accordance with an embodiment, the predefined time interval may be determined based on a set of entries of the record in which the time interval is stable. For example, the predefined time interval may be determined as "4" seconds.

At 708, a timer may be activated based on a receipt of a first user input of the set of user inputs. In at least one embodiment, the circuitry 202A may be configured to activate the timer based on the receipt of the first user input of the set of user inputs. The first user input may include an entered password that corresponds to the pre-stored password. For example, the timer may be activated based on a reception of the click via the UI element 406 (shown in FIG. 4A). The circuitry 202A may be configured to record the time instance (for example, "T-1") of reception of the click via the UI element 406.

At 710, the timer may be deactivated based on a receipt of a second user input of the set of user inputs. In at least one embodiment, the circuitry 202A may be configured to deactivate the timer based on the receipt of the second user input of the set of user inputs. A first time instance of the receipt of the first user input may be earlier than a second time instance of the receipt of the second user input. The second user input may include an entered password that corresponds to the pre-stored password. For example, the timer may be deactivated based on a reception of the click via the UI element 410 (shown in FIG. 4A). The circuitry 202A may be configured to record the time instance (for example, "T-2") of reception of the click via the UI element 410.

At 712, a first time interval may be determined based on a difference between the activation of the timer and the deactivation of the timer. In at least one embodiment, the circuitry 202A may be configured to determine the first time interval based on the difference between the activation of the timer and the deactivation of the timer. For example, the first time interval may correspond to the difference between the time instances "T-1" and "T-2". Thus, the first time interval may correspond to the time interval used, by the user 112, to enter the password included in the second user input.

At 714, the determined first time interval and the predefined time interval may be compared. In at least one embodiment, the circuitry 202A may be configured to compare the determined first time interval and the predefined time interval (for example, "4" seconds). The circuitry 202A may determine, based on the comparison, whether the first time interval is approximately equal to the predefined time interval, within a range centered at the predefined time interval, or outside the range centered at the predefined time interval. For example, the range may be 3-5 seconds. The predefined time interval (i.e., 4 seconds) may be at the center of the range. The first time interval may be outside the range if the first time interval is less than "3" seconds or greater than "5" seconds.

At 716, based on the comparison of the determined first time interval and the predefined time interval, the user 112 may be authenticated. In at least one embodiment, the circuitry 202A may be configured to authenticate the user 112 based on comparison of the determined first time interval and the predefined time interval. The circuitry 202A may authenticate the user 112 if the second user input of the set of user inputs is entered within 3-5 seconds (also if the first user input of the set of user inputs is entered within 3-5 seconds and the predefined number is 2). If the first time interval is outside the range, the user 112 may not be authenticated. In an embodiment, the time interval based user-authentication (as disclosed in 716) may be used as a technique to further increase the strength of the disclosed user authentication technique (of FIG. 6). Thus, a user may be required to repeatedly enter the correct passwords for the pre-defined (e.g., N) number of times, such that each password may be entered within a predefined time interval.

In accordance with an embodiment, the circuitry 202A may be configured to disable the authentication of the user 112 based on the comparison of the first time interval and the predefined time interval. For example, the first time interval may be determined as "2.8" seconds. The circuitry 202A may be configured to determine, based on the comparison of the first time interval and the predefined time interval, that the first time interval (i.e., "2.8" seconds) is less than the predefined time interval (i.e., "4" seconds). Further, the first time interval may be determined to be less than the lower bound (i.e., "3" seconds) of the range (i.e., "3-5" seconds). Based on the determination, the circuitry 202A may be configured to disable the authentication. The second user input may be entered by use of an automated agent, such as, a bot, instead of the user 112.

In accordance with an embodiment, the circuitry 202A may be configured to update the predefined number based on the comparison of the first time interval and the predefined time interval. For example, the first time interval may be determined as "5.5" seconds. The circuitry 202A may be configured to determine, based on the comparison of the first time interval and the predefined time interval, that the first time interval (i.e., "5.5" seconds) is greater than the predefined time interval (i.e., "4" seconds). Further, the first time interval may be determined to be greater than the upper bound (i.e., "5" seconds) of the range (i.e., 3-5 seconds). Based on the determination, the circuitry 202A may be configured to update the predefined number. For example, the predefined number may be updated from "2" to "3". Thus, the user 112 may be required to enter the correct password (i.e., the prestored password) three times for authentication of the user 112. This may enable the user 112 to get used to entering the correct password (since the number of times, for which the entry of the password is required, is increased). The update of the predefined number may lead to changes in the typing behavior of the user 112. The changes may include the user 112 entering the correct password within a time interval that may be close to the predefined time interval.

In accordance with an embodiment, the circuitry 202A may be configured to update the predefined time interval based on the comparison of the first time interval and the predefined time interval. For example, the predefined time interval may be updated from "4" seconds to "5.2" seconds. The predefined time interval may be updated based on the monitoring of the time interval used (by the user 112) to enter the user inputs for a prolonged monitoring period. The predefined time interval may be updated to synchronize with the changes in the typing behavior of the user 112 over a period of time. The circuitry 202A may update the range that may be centered at the updated predefined time interval. For example, the range may be updated from 3-5 seconds to 4-6.5 seconds. Control may pass to end.

In an embodiment, circuitry 202A may be configured receive a typing profile associated with the user 112. The typing profile may be generated based on tracking of user-specific parameters of the user 112, via an input device, such as, a keyboard, a touchpad, or a touch screen. The typing profile may include various typing related parameters associated the user 112, such as, a predefined interval that may elapse between reception of subsequent entries of a password, or a pressure applied on a keypad or a touch-screen of the electronic device 102 to enter characters of the password. In real-time, when the user 112 may provide the set of user inputs corresponding to the password, the circuitry 202A may monitor the typing behavior of the user 112, as described, for example, at 704 to 712. The circuitry 202A may compare the received typing profile (e.g., parameters such as, the predefined time interval) and the monitored typing behavior (e.g., parameters such as, the first time interval), as described, for example, at 714 to authenticate the user 112 based on the comparison. The authentication of the user 112 based on the comparison is described, for example, at 716. Based on the monitoring of the typing behavior and comparison of the monitored typing behavior with the typing profile of the user 112, the circuitry 202A may detect deviations in typing behavior of the user during the entry of a password (even if the password is entered correctly for the predefined number of times). Therefore, the level of security of information may be enhanced, since the electronic device 102 may have the capability to determine whether a password is entered by a genuine user or an unauthorized user, or whether a bot is involved in an entry of the password, through a brute force attack.

Although the flowchart 700 is illustrated as discrete operations, such as 704, 706, 708, 710, 712, 714, and 716, the disclosure is not so limited. Accordingly, in certain embodiments, such discrete operations may be further divided into additional operations, combined into fewer operations, or eliminated, depending on the implementation without detracting from the essence of the disclosed embodiments.

Figure 8:
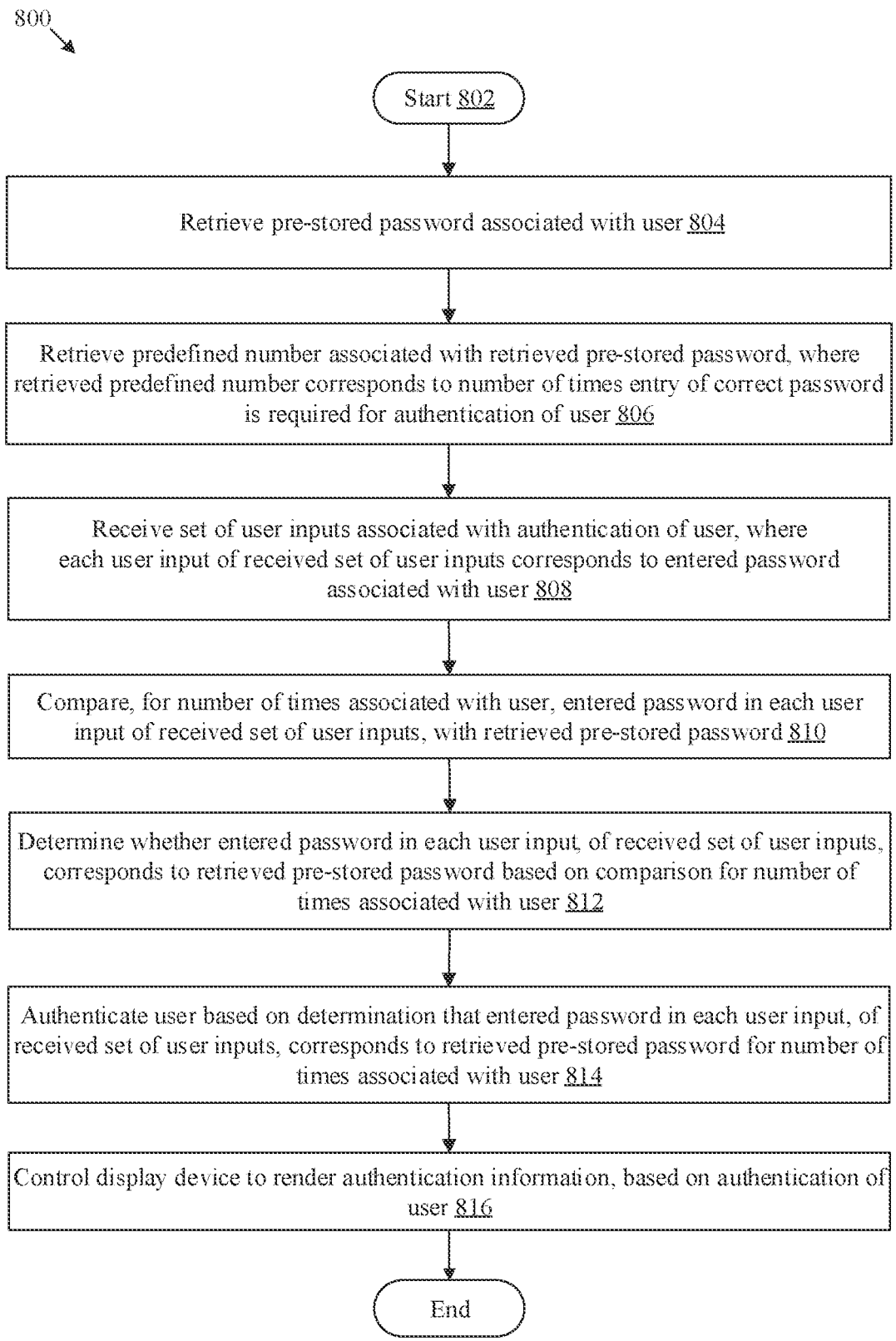
FIG. 8 is a flowchart that illustrates operations for an exemplary method for authentication of users based on re-entry of passwords, in accordance with an embodiment of the disclosure.

FIG. 8 is a flowchart that illustrates operations for an exemplary method for authentication of users based on re-entry of passwords, in accordance with an embodiment of the disclosure. FIG. 8 is explained in conjunction with elements from FIG. 1, FIG. 2A, FIG. 2B, FIG. 3, FIG. 4A, FIG. 4B, FIG. 4C, FIG. 4D, FIG. 5A, FIG. 5B, FIG. 5C, FIG. 6 and FIG. 7. With reference to FIG. 8, there is shown a flowchart 800. The operations from 802 to 816 may be implemented by any computing system, such as, by the electronic device 102 of FIG. 1. The operations may start at 802 and may proceed to 804.

At 804, a pre-stored password associated with the user 112 may be retrieved. In at least one embodiment, the circuitry 202A may be configured to retrieve the pre-stored password associated with the user 112. The details of retrieval of the pre-stored password, are described, for example, in FIG. 1, and FIG. 3 (at 302).

At 806, a predefined number associated with the retrieved pre-stored password may be retrieved. In at least one embodiment, the circuitry 202A may be configured to retrieve the predefined number associated with the retrieved pre-stored password. The retrieved predefined number may correspond to a number of times an entry of a correct password is required for an authentication of the user 112. The details of retrieval of the predefined number are described, for example, in FIG. 1 and FIG. 3 (at 304).

At 808, a set of user inputs associated with the authentication of the user 112 may be received. In at least one embodiment, the circuitry 202A may be configured to receive the set of user inputs associated with the authentication of the user 112. Each user input of the received set of user inputs may correspond to an entered password associated with the user 112. The details of reception of the set of user inputs, are described, for example, in FIG. 1, FIG. 3 (at 306), FIG. 4A, FIG. 4B, FIG. 4C, FIG. 4D, FIG. 5A, FIG. 5B, FIG. 5C, and FIG. 6 (at 606).

At 810, the entered password in each user input, of the received set of user inputs, may be compared with the retrieved pre-stored password for the number of times associated with the user 112. In at least one embodiment, the circuitry 202A may be configured to compare, for the number of times associated with the user 112, the entered password in each user input, of the received set of user inputs, with the retrieved pre-stored password. The details of application of comparison of the entered password with the retrieved pre-stored password, are described, for example, in FIG. 1, FIG. 3 (at 308 and 310), FIG. 4A, FIG. 4B, FIG. 4C, FIG. 4D, FIG. 5A, FIG. 5B, FIG. 5C and FIG. 6 (at 608 and 610).

At 812, it may be determined whether the entered password in each user input, of the received set of user inputs, corresponds to the retrieved pre-stored password, based on the comparison for the number of times associated with the user 112. In at least one embodiment, the circuitry 202A may be configured to determine whether the entered password in each user input, of the received set of user inputs, corresponds to the retrieved pre-stored password, based on the comparison for the number of times associated with the user 112. The details of determination of the correspondence of the entered password and the pre-stored password, are described, for example, in FIG. 1, FIG. 3 (at 312), FIG. 4A, FIG. 4B, FIG. 4C, FIG. 4D, FIG. 5A, FIG. 5B, FIG. 5C, and FIG. 6 (at 608 and 610).

At 814, the user 112 may be authenticated based on the determination of correspondence between the entered password in each user input, of the received set of user inputs, and the retrieved pre-stored password, for the number of times associated with the user 112. In at least one embodiment, the circuitry 202A may be configured to authenticate the user 112 based on the determination that the entered password in each user input, of the received set of user inputs, corresponds to the retrieved pre-stored password for the number of times associated with the user 112. The details of authentication of the user 112 based on the determination of correspondence between the entered password and the pre-stored password, are described, for example, in FIG. 1, FIG. 3 (at 312), FIG. 4A, FIG. 4C, FIG. 5A and FIG. 6 (at 612).

At 816, based on the authentication of the user 112, the display device 210 may be controlled to render authentication information. In at least one embodiment, the circuitry 202A may be configured to control the display device 210 to render the authentication information, based on the authentication of the user 112. The details of control of the display device 210 for rendering of authentication information, are described, for example, in FIG. 1, FIG. 3 (at 314), FIG. 4A, FIG. 4C, and FIG. 5A. Control may pass to end.

Although the flowchart 800 is illustrated as discrete operations, such as 804, 806, 808, 810, 812, 814, and 816, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include retrieval of a pre-stored password associated with the user 112. The operations may further include retrieval of a predefined number associated with the retrieved pre-stored password, where the retrieved predefined number may correspond to a number of times an entry of a correct password is required for an authentication of the user 112. The operations may further include reception of a set of user inputs associated with the authentication of the user 112, where each user input of the received set of user inputs corresponds to an entered password associated with the user 112. The operations may further include comparison, for the number of times associated with the user 112, the entered password in each user input, of the received set of user inputs, with the retrieved pre-stored password. The operations may further include determination of whether the entered password in each user input, of the received set of user inputs, corresponds to the retrieved pre-stored password, based on the comparison for the number of times associated with the user 112. The operations may further include authentication of the user 112 based on the determination that the entered password in each user input, of the received set of user inputs, corresponds to the retrieved pre-stored password for the number of times associated with the user 112. The operations may further include control of the display device (e.g., the display device 210) to render authentication information, based on the authentication of the user 112.

Exemplary aspects of the disclosure may include an electronic device (such as, the electronic device 102 of FIG. 1) that may include circuitry (such as the circuitry 202A). The circuitry 202A may be configured to retrieve a pre-stored password associated with the user 112. The circuitry 202A may be further configured to retrieve a predefined number associated with the retrieved pre-stored password. The retrieved predefined number may correspond to a number of times an entry of a correct password is required for an authentication of the user 112. The circuitry 202A may be further configured to receive a set of user inputs associated with the authentication of the user 112. Each user input of the received set of user inputs may correspond to an entered password associated with the user 112. A count of the received set of user inputs corresponds to the retrieved predefined number. The retrieved predefined number may be updated based on the authentication of the user 112. The circuitry 202A may be further configured to compare, for the number of times associated with the user 112, the entered password in each user input, of the received set of user inputs, with the retrieved pre-stored password. The circuitry 202A may be further configured to determine whether the entered password in each user input, of the received set of user inputs, corresponds to the retrieved pre-stored password, based on the comparison for the number of times associated with the user 112. The circuitry 202A may be further configured to authenticate the user 112 based on the determination that the entered password in each user input, of the received set of user inputs, corresponds to the retrieved pre-stored password for the number of times associated with the user 112. The circuitry 202A may be further configured to control a display device (e.g., the display device 210 associated with the electronic device 102) to render authentication information, based on the authentication of the user 112.

In accordance with an embodiment, the circuitry 202A may be further configured to determine a first number corresponding to a number of times that the entered password in the received set of user inputs corresponds to the retrieved pre-stored password, based on the comparison. The circuitry 202A may be further configured to compare the determined first number and the retrieved predefined number. The circuitry 202A may be further configured to determine a second number based on the comparison of the determined first number and the retrieved predefined number. The determined second number may correspond to a number of times that the correct password is required to be re-entered for the authentication of the user 112. The determined second number may correspond to the retrieved predefined number or a difference between the retrieved predefined number and the determined first number.

In accordance with an embodiment, the circuitry 202A may be further configured to monitor a typing behavior of the user based on a reception of the set of user inputs. The circuitry 202A may be further configured to determine, based on the typing behavior, time delay information indicative of a predefined time interval associated with a password entry for the authentication of the user 112. The circuitry 202A may be further configured to activate a timer based on a receipt of a first user input of the set of user inputs. The circuitry 202A may be further configured to deactivate the timer based on a receipt of a second user input of the set of user inputs. The first time instance of the receipt of the first user input may be earlier than a second time instance of the receipt of the second user input. The circuitry 202A may be further configured to determine a first time interval based on a difference between the activation of the timer and the deactivation of the timer. The circuitry 202A may be further configured to compare the determined first time interval and the predefined time interval. The authentication of the user 112 may be further based on the comparison of the determined first time interval and the predefined time interval. The circuitry 202A may be further configured to disable the authentication of the user 112 based on the comparison of the first time interval and the predefined time interval. The circuitry 202A may be further configured to update the predefined number based on the comparison of the first time interval and the predefined time interval. The circuitry 202A may be further configured to update the predefined time interval based on the comparison of the first time interval and the predefined time interval.

In accordance with an embodiment, the first user input may correspond to an entry of the correct password and the second user input may correspond to an entry of an incorrect password. In accordance with another embodiment, the first user input may correspond to an entry of an incorrect password and the second user input may correspond to an entry of the correct password.

In accordance with an embodiment, the received set of user inputs may correspond to a set of entered texts associated with the user 112, and a count of the set of entered texts may correspond to the retrieved predefined number.

In accordance with an embodiment, the circuitry 202A may be further configured to determine a count of user inputs in the received set of user inputs that correspond to an entry of a wrong password. The circuitry 202A may be further configured to disable the authentication of the user 112 based on the determined count of the user inputs and a predefined threshold.

In accordance with an embodiment, the circuitry 202A may be further configured to determine a count of user inputs in the received set of user inputs that correspond to an entry of a wrong password. The circuitry 202A may be further configured to update the retrieved predefined number based on the determined count of the user inputs and a predefined threshold.

In accordance with an embodiment, the circuitry 202A may be further configured to receive a typing profile associated with the user 112. The circuitry 202A may be further configured to monitor a typing behavior of the user 112 based on the receipt of the set of user inputs. The circuitry 202A may be further configured to compare the received typing profile and the monitored typing behavior. The authentication of the user 112 may be further based on the comparison of the received typing profile and the monitored typing behavior.

In accordance with an embodiment, the circuitry 202A may be further configured to generate a first hash of the retrieved pre-stored password. The circuitry 202A may be further configured to generate a second hash of the retrieved predefined number. The circuitry 202A may be further configured to perform a first comparison between a hash of each user input of the received set of user inputs and the first hash. The circuitry 202A may be further configured to perform a second comparison between a hash of the number of times associated with the user and the second hash. The authentication of the user 112 may be further based on the first comparison and the second comparison.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
   circuitry configured to:
   retrieve a pre-stored password associated with a user;
   retrieve a predefined number associated with the retrieved pre-stored password, wherein
      the retrieved predefined number corresponds to a number of times an entry of a correct password is required for an authentication of the user;
   receive a set of user inputs associated with the authentication of the user, wherein
      each user input of the received set of user inputs corresponds to an entered password associated with the user;
   compare, for the number of times associated with the user, the entered password in each user input, of the received set of user inputs, with the retrieved pre-stored password;
   determine whether the entered password in each user input, of the received set of user inputs, corresponds to the retrieved pre-stored password, based on the comparison for the number of times associated with the user;
   authenticate the user based on the determination that the entered password in each user input, of the received set of user inputs, corresponds to the retrieved pre-stored password for the number of times associated with the user; and
   control a display device to render authentication information, based on the authentication of the user.

2. The electronic device according to claim 1, wherein a count of the received set of user inputs corresponds to the retrieved predefined number.

3. The electronic device according to claim 1, wherein the retrieved predefined number is updated based on the authentication of the user.

4. The electronic device according to claim 1, wherein the circuitry is further configured to:
   determine a first number corresponding to a number of times that the entered password in the received set of user inputs corresponds to the retrieved pre-stored password, based on the comparison;
   compare the determined first number and the retrieved predefined number; and
   determine a second number based on the comparison of the determined first number and the retrieved predefined number, wherein
      the determined second number corresponds to a number of times that the correct password is required to be re-entered for the authentication of the user.

5. The electronic device according to claim 4, wherein the determined second number corresponds to the retrieved predefined number.

6. The electronic device according to claim 4, wherein the determined second number corresponds to a difference between the retrieved predefined number and the determined first number.

7. The electronic device according to claim 1, wherein the circuitry is further configured to:
   monitor a typing behavior of the user based on a reception of the set of user inputs;
   determine, based on the typing behavior, time delay information indicative of a predefined time interval associated with a password entry for the authentication of the user;
   activate a timer based on a receipt of a first user input of the set of user inputs;
   deactivate the timer based on a receipt of a second user input of the set of user inputs, wherein
      a first time instance of the receipt of the first user input is earlier than a second time instance of the receipt of the second user input;
   determine a first time interval based on a difference between the activation of the timer and the deactivation of the timer; and
   compare the determined first time interval and the predefined time interval, wherein
      the authentication of the user is further based on the comparison of the determined first time interval and the predefined time interval.

8. The electronic device according to claim 7, wherein the first user input corresponds to an entry of the correct password and the second user input corresponds to an entry of an incorrect password.

9. The electronic device according to claim 7, wherein the first user input corresponds to an entry of an incorrect password and the second user input corresponds to an entry of the correct password.

10. The electronic device according to claim 7, wherein the circuitry is further configured to disable the authentication of the user based on the comparison of the first time interval and the predefined time interval.

11. The electronic device according to claim 7, wherein the circuitry is further configured to update the predefined number based on the comparison of the first time interval and the predefined time interval.

12. The electronic device according to claim 7, wherein the circuitry is further configured to update the predefined time interval based on the comparison of the first time interval and the predefined time interval.

13. The electronic device according to claim 1, wherein
the received set of user inputs corresponds to a set of entered texts associated with the user, and
a count of the set of entered texts corresponds to the retrieved predefined number.

14. The electronic device according to claim 1, wherein the circuitry is further configured to:
determine a count of user inputs in the received set of user inputs that correspond to an entry of a wrong password; and
disable the authentication of the user based on the determined count of the user inputs and a predefined threshold.

15. The electronic device according to claim 1, wherein the circuitry is further configured to:
determine a count of user inputs in the received set of user inputs that correspond to an entry of a wrong password; and
update the retrieved predefined number based on the determined count of the user inputs and a predefined threshold.

16. The electronic device according to claim 1, wherein the circuitry is further configured to:
receive a typing profile associated with the user;
monitor a typing behavior of the user based on the reception of the set of user inputs; and
compare the received typing profile and the monitored typing behavior, wherein
the authentication of the user is further based on the comparison of the received typing profile and the monitored typing behavior.

17. The electronic device according to claim 1, wherein the circuitry is further configured to:
determine a first hash of the retrieved pre-stored password;
determine a second hash of the retrieved predefined number;
perform a first comparison between a hash of each user input of the received set of user inputs and the first hash; and
perform a second comparison between a hash of the number of times associated with the user and the second hash, wherein
the authentication of the user is further based on the first comparison and the second comparison.

18. A method, comprising:
in an electronic device:
retrieving a pre-stored password associated with a user;
retrieving a predefined number associated with the retrieved pre-stored password, wherein
the retrieved predefined number corresponds to a number of times an entry of a correct password is required for an authentication of the user;
receiving a set of user inputs associated with the authentication of the user, wherein
each user input of the received set of user inputs corresponds to an entered password associated with the user;
comparing, for the number of times associated with the user, the entered password in each user input, of the received set of user inputs, with the retrieved pre-stored password;
determining whether the entered password in each user input, of the received set of user inputs, corresponds to the retrieved pre-stored password, based on the comparison for the number of times associated with the user;
authenticating the user based on the determination that the entered password in each user input, of the received set of user inputs, corresponds to the retrieved pre-stored password for the number of times associated with the user; and
controlling a display device to render authentication information, based on the authentication of the user.

19. The method according to claim 18, wherein a count of the received set of user inputs corresponds to the retrieved predefined number.

20. A non-transitory computer-readable medium having stored thereon, computer-executable instructions that when executed by an electronic device, causes the electronic device to execute operations, the operations comprising:
retrieving a pre-stored password associated with a user;
retrieving a predefined number associated with the retrieved pre-stored password, wherein
the retrieved predefined number corresponds to a number of times an entry of a correct password is required for an authentication of the user;
receiving a set of user inputs associated with the authentication of the user, wherein
each user input of the received set of user inputs corresponds to an entered password associated with the user;
comparing, for the number of times associated with the user, the entered password in each user input, of the received set of user inputs, with the retrieved pre-stored password;
determining whether the entered password in each user input, of the received set of user inputs, corresponds to the retrieved pre-stored password, based on the comparison, for the number of times associated with the user;
authenticating the user based on the determination that the entered password in each user input, of the received set of user inputs, corresponds to the retrieved pre-stored password for the number of times associated with the user; and
controlling a display device to render authentication information, based on the authentication of the user.

* * * * *